US 8,835,595 B2

(12) United States Patent
Oda et al.

(10) Patent No.: US 8,835,595 B2
(45) Date of Patent: Sep. 16, 2014

(54) POLYAMIDE COMPOUND

(75) Inventors: Takafumi Oda, Kanagawa (JP); Ryoji Otaki, Kanagawa (JP); Shota Arakawa, Kanagawa (JP); Tsuneaki Masuda, Kanagawa (JP); Hiroyuki Matsushita, Niigata (JP); Ryuji Hasemi, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 238 days.

(21) Appl. No.: 13/519,205

(22) PCT Filed: Dec. 24, 2010

(86) PCT No.: PCT/JP2010/073371
§ 371 (c)(1),
(2), (4) Date: Jul. 24, 2012

(87) PCT Pub. No.: WO2011/081099
PCT Pub. Date: Jul. 7, 2011

(65) Prior Publication Data
US 2012/0302723 A1 Nov. 29, 2012

(30) Foreign Application Priority Data

Dec. 28, 2009 (JP) ................................ 2009-298756
Mar. 25, 2010 (JP) ................................ 2010-070340
May 26, 2010 (JP) ................................ 2010-120893
Jun. 3, 2010 (JP) ................................ 2010-127969

(51) Int. Cl.
C08G 77/06 (2006.01)
C08L 77/06 (2006.01)

(52) U.S. Cl.
CPC ............... *G08G 69/36* (2013.01); *C08L 77/06* (2013.01)
USPC ........... 528/310; 525/432; 528/328; 528/346; 528/381

(58) Field of Classification Search
USPC ................... 528/310, 328, 346, 381; 525/432
See application file for complete search history.

(56) References Cited

U.S. PATENT DOCUMENTS

| 6,538,073 | B1 | 3/2003 | Oenbrink et al. |
| 2001/0056148 | A1 | 12/2001 | Sato et al. |
| 2008/0193691 | A1 | 8/2008 | Bussi et al. |
| 2008/0274355 | A1 | 11/2008 | Hewel |

FOREIGN PATENT DOCUMENTS

| CA | 2057534 | 6/1992 |
| FR | 2884518 A1 | 10/2006 |
| JP | 2 72851 | 3/1990 |
| JP | 4 90848 | 3/1992 |
| JP | 5 115776 | 5/1993 |
| JP | 2991437 | 12/1999 |
| JP | 2008 274288 | 11/2008 |
| JP | 2010 248322 | 11/2010 |
| TW | 205505 | 5/1993 |

OTHER PUBLICATIONS

. Arvanitoyannis et al "Novel copolyamides based on adipic acid, 1,6-hexanediamine and alpha amino acids. 2. Study of properties and their biodegradability for food-packaging application", Polymer, vol. 36 No. 15, Aug. 1995, pp. 2957-2967.*
U.S. Appl. No. 13/699,678, filed Nov. 23, 2012, Oda, et al.
U.S. Appl. No. 13/807,169, filed Dec. 27, 2012, Oda, et al.
U.S. Appl. No. 13/641,997, filed Oct. 18, 2012, Oda, et al.
Office Action issued Dec. 27, 2013 in TW application No. 099146208.
U.S. Appl. No. 14/128,988, filed Dec. 27, 2013, Arakawa, et al.
U.S. Appl. No. 14/129,198, filed Dec. 24, 2013, Oda, et al.
International Search Report Issued Apr. 5, 2011 in PCT/JP10/73371 Filed Dec. 24, 2010.
Search Report issued Jul. 11, 2013 in EU Application No. 10840955.8-1306/2520604.
Arvanitoyannis I et al.: "New copolyamides based on adipic acid, aliphatic diamines and aminoacids: synthesis, characterization and biodegradability, 5A", Macromolecular Chemistry and Physics, Wiley-VCH Verlag, Weinheim, DE, vol. 196, n.4, Apr. 1, 1995, pp. 1129-1151, XP000515384.
Arvanitoyannis I et al.: "Nobel copolyamides based on adipic acid, 1,6-hexanediamine and alpha-amino acids: 2. Study of properties and their biodegradability for food—packaging applications", Polymer, Elsevier Science Publishers B.V. GB. vol. 36, No. 15, Jul. 1, 1995, pp. 2957-2967 XP004025677.
U.S. Appl. No. 13/997,809, filed Jun. 25, 2013, Oda, et al.

* cited by examiner

*Primary Examiner* — Gregory Listvoyb
(74) *Attorney, Agent, or Firm* — Oblon, Spivak, McClelland, Maier & Neustadt, L.L.P.

(57) ABSTRACT

A polyamide compound containing: from 25 to 50 mol % of a diamine unit, which contains an aromatic diamine unit represented by the following formula (I), in an amount of 50 mol % or more; from 25 to 50 mol % of a dicarboxylic acid unit, which contains a linear aliphatic dicarboxylic acid unit represented by the following formula (II-1) and/or an aromatic dicarboxylic acid unit represented by the following formula (II-2), in an amount in total of 50 mol % or more; and from 0.1 to 50 mol % of a constitutional unit represented by the following formula (III):

$$\left[ \mathrm{N} \mathrm{H} - \mathrm{CH}_2 - \!\!\! \bigcirc \!\!\! - \mathrm{CH}_2 - \mathrm{N} \mathrm{H} \right] \quad (\mathrm{I})$$

$$\left[ \begin{matrix} \mathrm{C} - (\mathrm{CH}_2)_n - \mathrm{C} \\ \| \quad\quad\quad\quad \| \\ \mathrm{O} \quad\quad\quad\quad \mathrm{O} \end{matrix} \right] \quad (\mathrm{II}\text{-}1)$$

$$\left[ \begin{matrix} \mathrm{C} - \mathrm{Ar} - \mathrm{C} \\ \| \quad\quad\quad \| \\ \mathrm{O} \quad\quad\quad \mathrm{O} \end{matrix} \right] \quad (\mathrm{II}\text{-}2)$$

$$\left[ \begin{matrix} \mathrm{R} \\ | \\ \mathrm{N} - \mathrm{C} - \mathrm{C} \\ | \quad | \quad \| \\ \mathrm{H} \quad \mathrm{H} \quad \mathrm{O} \end{matrix} \right] \quad (\mathrm{III})$$

wherein n represents an integer of from 2 to 18, Ar represents an arylene group, and R represents a substituted or unsubstituted alkyl group or a substituted or unsubstituted aryl group.

19 Claims, 2 Drawing Sheets

POLYAMIDE COMPOUND

This application is a 371 of PCT/JP10/73371, filed Dec. 24, 2010. Priority to Japanese patent applications 2009-298756, filed Dec. 28, 2009; 2010-070340, filed Mar. 25, 2010; 2010-120893, filed May 26, 2010, and 2010-127969, filed Jun. 3, 2010, are claimed.

TECHNICAL FIELD

The present invention relates to a polyamide compound (including a polyamide resin and a polyamide oligomer) that exhibits an oxygen absorbing capability.

BACKGROUND ART

Metallic cans, glass bottles, containers and molded articles formed of a thermoplastic resin, and the like have been used as packing materials for medical drugs, beverages, foods chemical products and the like. Among these, containers and molded articles formed of a thermoplastic resin are superior in lightweight property, moldability, packaging productivity, such as heat sealing property, and cost, and thus have been used in the largest quantity. In general, however, containers and molded articles formed of a thermoplastic resin undergo oxygen permeation in nonnegligible extent through a container wall, which causes a problem in storageability of contents, although they are excellent as a packaging material.

For preventing oxygen permeation from the outside of the container, the container or molded article of a thermoplastic resin is formed to have a container wall having a multilayer structure, in which at least one layer thereof is an oxygen barrier layer, such as poly-m-xylylene adipamide (which is hereinafter referred to as "N-MXD6"), an ethylene-vinyl alcohol copolymer, polyacrylonitrile and an aluminum foil. However, the container fails to prevent not only invasion of a slight amount of oxygen from the outside of the container, but also deterioration of the contents of the container that are sensitive to oxygen, such as beer, with oxygen remaining in the container.

An oxygen absorbent has been steadily used for removing oxygen in a container. For example, Patent Documents 1 and 2 disclose an oxygen absorbing multilayer material and an oxygen absorbing film containing an oxygen absorbent, such as iron powder, dispersed in a resin. Patent Document 3 discloses an oxygen scavenging barrier for packaging that absorbs oxygen inside and outside a container, in which the oxygen scavenging barrier contains a polymer material, such as polyamide, to which a metallic catalyst, such as cobalt, is added. Patent Document 4 discloses a product containing an oxygen removing layer containing an ethylenic unsaturated compound, such as polybutadiene, and a transition metal catalyst, such as cobalt, and an oxygen barrier layer, such as polyamide.

CITATION LIST

Patent Literature

[Patent Document 1] JP-A-2-72851
[Patent Document 2] JP-A-4-90848
[Patent Document 3] Japanese Patent No. 2,991,437
[Patent Document 4] JP-A-5-115776

SUMMARY OF INVENTION

Technical Problem

An oxygen absorbing multilayer material and an oxygen absorbing film containing an oxygen absorbent, such as iron powder, dispersed in a resin are opaque since the resin is colored with the oxygen absorbent, such as iron powder, and thus have restrictions in usage, i.e., they may not be used in a field of packaging requiring transparency.

An oxygen scavenging resin composition containing a transition metal, such as cobalt, has an advantage that the composition may be applied to a packaging container requiring transparency, but is not favorable therefor since the resin composition is colored with the transition metal catalyst. In the resin composition, furthermore, the resin is oxidized through absorption of oxygen by the transition metal catalyst. Specifically, it is considered that the oxidation may occur through such reaction as generation of a radical due to withdrawal of a hydrogen atom of a methylene chain adjacent to an arylene group of the polyamide resin by the transition metal atom, generation of a peroxy radical caused by addition of an oxygen molecule to the radical, and withdrawal of a hydrogen atom by the peroxy radical. The resin is oxidized by oxygen absorption through the aforementioned mechanism, which results in such problems as generation of offensive odor in a content of a container due to decomposition products, and deterioration of the color, the strength and the like of the container due to oxidative degradation of the resin.

The problem to be solved by the present invention is to provide a polyamide compound that exhibits a sufficient oxygen absorbing capability without a metal contained, generates no offensive odor, and has considerably good transparency.

Solution to Problems

The present invention provides the following polyamide compound.

A polyamide compound containing: from 25 to 50% by mol of a diamine unit, which contains an aromatic diamine unit represented by the following general formula (I), in an amount of 50% by mol or more; from 25 to 50% by mol of a dicarboxylic acid unit, which contains a linear aliphatic dicarboxylic acid unit represented by the following general formula (II-1) and/or an aromatic dicarboxylic acid unit represented by the following general formula (II-2), in an amount in total of 50% by mol or more; and from 0.1 to 50% by mol of a constitutional unit represented by the following general formula (III):

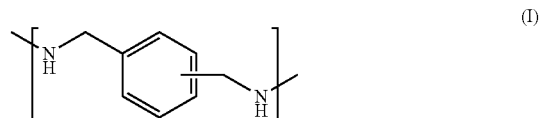

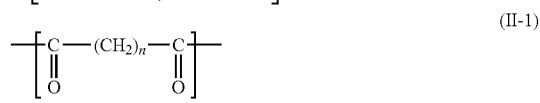

wherein, in the general formula (II-1), n represents an integer of from 2 to 18, in the general formula (II-2), Ar represents an arylene group, and in the general formula (III), R represents a substituted or unsubstituted alkyl group or a substituted or unsubstituted aryl group.

Advantageous Effects of Invention

The polyamide compound of the present invention is excellent in oxygen absorbing capability. Accordingly, for example, the polyamide compound of the present invention may be charged in a sachet or the like and favorably used as an oxygen absorbent. More preferred examples of the usage of the polyamide compound of the present invention include a usage as a packaging material or a packaging container. A packaging material or a packaging container using the polyamide compound of the present invention exhibits a sufficient oxygen absorbing capability without a metal contained, generates no offensive odor, and has considerably good transparency, thereby storing a content in good order.

DESCRIPTION OF EMBODIMENTS

1. Polyamide Compound

Figure 1:
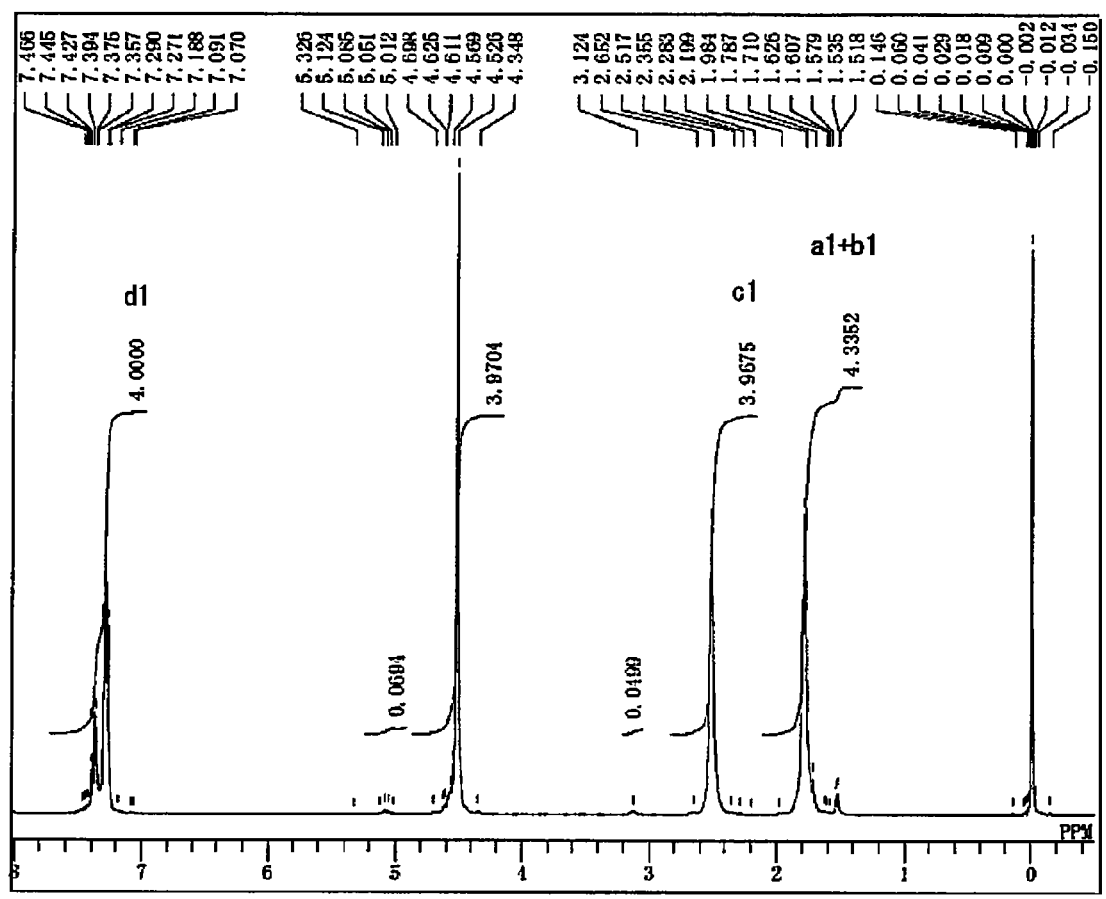
FIG. 1 is a $^1$H-NMR chart of the polyamide compound 101 produced in Example 101.

The polyamide compound of the present invention contains: from 25 to 50% by mol of a diamine unit, which contains an aromatic diamine unit represented by the following general formula (I), in an amount of 50% by mol or more; from 25 to 50% by mol of a dicarboxylic acid unit, which contains a linear aliphatic dicarboxylic acid unit represented by the following general formula (II-1) and/or an aromatic dicarboxylic acid unit represented by the following general formula (II-2), in an amount in total of 50% by mol or more; and from 0.1 to 50% by mol of a tertiary hydrogen-containing carboxylic acid unit (preferably a constitutional unit represented by the following general formula (III)):

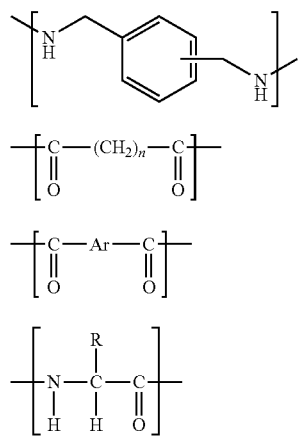

wherein, in the general formula (II-1), n represents an integer of from 2 to 18, in the general formula (II-2), Ar represents an arylene group, and in the general formula (III), R represents a substituted or unsubstituted alkyl group or a substituted or unsubstituted aryl group.

The total content of the diamine unit, the dicarboxylic acid unit and the tertiary hydrogen-containing carboxylic acid unit does not exceed 100% by mol. The polyamide compound of the present invention may further contain a constitutional unit other than those mentioned above in such a range that does not impair the advantages of the present invention.

The polyamide compound of the present invention includes a polyamide resin and a polyamide oligomer.

The "polyamide resin" of the present invention means the polyamide compound of the present invention that has a relative viscosity of 1.8 or more. The polyamide resin is a material that can be molded solely and can be processed to a packaging material and a packaging container. The polyamide resin of the present invention may contain, depending on necessity, another resin and additive added and mixed thereto, and a polyamide composition obtained in such a manner may be molded. The polyamide resin of the present invention exhibits sufficient oxygen absorbing capability without a metal contained, generates no offensive odor, and has considerably good transparency.

The "polyamide oligomer" of the present invention means the polyamide compound of the present invention that has a relative viscosity of less than 1.8. The polyamide oligomer is a material that cannot generally be molded solely. In general, an oligomer often means a polymer having a number average molecular weight of 1,000 or less, but the polyamide oligomer of the present invention includes not only the ordinary oligomer, but also a polymer having a number average molecular weight of less than 10,000.

The polyamide oligomer of the present invention may be favorably charged in a sachet or the like and used as an oxygen absorbent. The polyamide oligomer of the present invention may be favorably used as a resin raw material or a resin additive. In the case where the polyamide oligomer of the present invention is used as a resin raw material, the polyamide oligomer may be copolymerized with another resin material, thereby providing a copolymer resin, and the copolymer resin may be molded into a packaging material or a packaging container. In the case where the polyamide oligomer of the present invention is used as a resin additive, a resin composition obtained by adding the polyamide oligomer to a resin may be molded into a packaging material or a packaging container. In this case, a sufficient oxygen absorbing capability may be obtained without deterioration of the transparency and the mechanical strength of the resin. The copolymer resin and the resin composition obtained by using the polyamide oligomer of the present invention exhibit a sufficient oxygen absorbing capability without a metal contained, and generate no offensive odor.

In the polyamide compound of the present invention, the content of the tertiary hydrogen-containing carboxylic acid unit is from 0.1 to 50% by mol. When the content of the tertiary hydrogen-containing carboxylic acid unit is less than 0.1% by mol, a sufficient oxygen absorbing capability is not exhibited. When the content of the tertiary hydrogen-containing carboxylic acid unit exceeds 50% by mol, the properties of the polyamide compound, such as the gas barrier property and the mechanical property, are deteriorated since the amount of tertiary hydrogen contained is too large, and particularly in the case where the tertiary hydrogen-containing carboxylic acid is an amino acid, not only the heat resistance becomes insufficient due to a continuous peptide chain, but also a ring structure formed of a dimer of the amino acid is produced and inhibits the polymerization. The content of the tertiary hydrogen-containing carboxylic acid unit is preferably 0.2% by mol or more, and more preferably 1% by mol or more, and is preferably 40% by mol or less, and more preferably 30% by mol or less, from the standpoint of the oxygen absorbing capability and the properties of the polyamide compound.

In the polyamide compound of the present invention, the content of the diamine unit is from 25 to 50% by mol, and from the standpoint of the oxygen absorbing capability and the properties of the polymer, is preferably from 30 to 50% by mol. In the polyamide compound of the present invention, similarly, the content of the dicarboxylic acid unit is from 25 to 50% by mol, and preferably from 30 to 50% by mol.

The ratio of the contents of the diamine unit and the dicarboxylic acid unit is preferably approximately the same amounts, and more preferably the content of the dicarboxylic acid unit is ±2% by mol of the content of the diamine unit, from the standpoint of the polymerization reaction. When the content of the dicarboxylic acid unit deviates from the range of ±2% by mol of the content of the diamine unit, it is difficult to increase the polymerization degree of the polyamide compound, and a long period of time is required for increasing the polymerization degree, which may cause thermal degradation.

1-1. Diamine Unit

The diamine unit in the polyamide compound of the present invention contains an aromatic diamine unit represented by the general formula (I) in an amount of 50% by mol or more based on the diamine units, from the standpoint of imparting excellent gas barrier property to the polyamide compound, enhancing the transparency and the color tone, and improvement of the moldability, and the content thereof is preferably 70% by mol or more, more preferably 80% by mol or more, and further preferably 90% by mol or more, and is preferably 100% by mol or less.

Examples of the compound capable of constituting the aromatic diamine unit represented by the general formula (I) include o-xylylenediamine, m-xylylenediamine and p-xylylenediamine. These compounds may be used solely or as a combination of two or more kinds thereof.

The diamine unit in the polyamide compound of the present invention preferably contains a m-xylylenediamine unit in an amount of 50% by mol or more, from the standpoint of exhibiting the excellent gas barrier property, and improving the moldability as a versatile thermoplastic resin, and the content thereof is preferably 70% by mol or more, more preferably 80% by mol or more, and further preferably 90% by mol or more, and is preferably 100% by mol or less.

Examples of the compound capable of constituting other diamine units than the aromatic diamine unit represented by the general formula (I) include an aromatic diamine, such as p-phenylenediamine, an aliphatic diamine, such as 2-methyl-1,5-pentanediamine and 1-amino-3-aminomethyl-3,5,5-trimethylcyclohexane, and a polyether diamine having an ether bond represented by Jeffamine and Elastamine (both trade names), produced by Huntsman International LLC, but are not limited thereto. These compounds may be used solely or as a combination of two or more kinds thereof.

1-2. Dicarboxylic Acid Unit

The dicarboxylic acid unit in the polyamide compound of the present invention contains a linear aliphatic dicarboxylic acid unit represented by the general formula (II-1) and/or an aromatic dicarboxylic acid unit represented by the general formula (II-2), in an amount in total of 50% by mol or more based on the dicarboxylic acid units, from the standpoint of the reactivity upon polymerization, and the crystallinity and the moldability of the polyamide compound, and the content thereof is preferably from 70% by mol or more, more preferably 80% by mol or more, and further preferably 90% by mol or more, and is preferably 100% by mol or less.

Examples of the compound capable of constituting other dicarboxylic acid units than the dicarboxylic acid unit represented by the general formula (II-1) or (II-2) include dicarboxylic acids such as oxalic acid, malonic acid, fumaric acid, maleic acid, 1,3-benzenediacetic acid and 1,4-benzenediacetic acid, but are not limited thereto.

In the dicarboxylic acid unit in the polyamide compound of the present invention, the content ratio of the linear aliphatic dicarboxylic acid unit and the aromatic dicarboxylic acid unit (linear aliphatic dicarboxylic acid unit/aromatic dicarboxylic acid unit) is not particularly limited and may be appropriately determined depending on the purposes. For example, in the case where the glass transition temperature of the polyamide compound is to be increased, and the crystallinity of the polyamide compound is to be decreased, the ratio (linear aliphatic dicarboxylic acid unit/aromatic dicarboxylic acid unit) is preferably from 0/100 to 60/40, more preferably from 0/100 to 40/60, and further preferably from 0/100 to 30/70, with the total of both the units being 100. In the case where the glass transition temperature of the polyamide compound is to be decreased for imparting flexibility to the polyamide compound, the ratio (linear aliphatic dicarboxylic acid unit/aromatic dicarboxylic acid unit) is preferably from 40/60 to 100/0, more preferably from 60/40 to 100/0, and further preferably from 70/30 to 100/0, with the total of both the units being 100.

1-2-1. Linear Aliphatic Dicarboxylic Acid Unit

The polyamide compound of the present invention preferably contains the linear aliphatic dicarboxylic acid unit represented by the general formula (II-1) for imparting a suitable glass transition temperature and crystallinity to the polyamide compound, and for imparting thereto flexibility that is required for a packaging material and a packaging container.

In the general formula (II-1), n represents an integer of from 2 to 18, preferably from 3 to 16, more preferably from 4 to 12, and further preferably from 4 to 8.

Examples of the compound capable of constituting the linear aliphatic dicarboxylic acid unit represented by the general formula (II-1) include succinic acid, glutaric acid, adipic acid, pimelic acid, suberic acid, azelaic acid, sebacic acid, 1,10-decanedicarboxylic acid, 1,11-undecanedicarboxylic acid and 1,12-dodecanedicarboxylic acid, but are not limited thereto. These compounds may be used solely or as a combination of two or more kinds thereof.

The kind of the linear aliphatic dicarboxylic acid unit represented by the general formula (II-1) may be appropriately determined depending on the purposes. The linear aliphatic dicarboxylic acid unit in the polyamide compound of the present invention preferably contains at least one selected from the group consisting of an adipic acid unit, a sebacic acid unit and a 1,12-dodecanedicarboxylic acid unit, in an amount in total of 50% by mol or more in the linear aliphatic dicarboxylic acid unit from the standpoint of imparting excellent gas barrier property to the polyamide compound, and maintaining the heat resistance of a packaging material and a packaging container after thermal sterilization, and the content thereof is more preferably 70% by mol or more, further preferably 80% by mol or more, and particularly preferably 90% by mol or more, and is preferably 100% by mol or less.

The linear aliphatic dicarboxylic acid unit in the polyamide compound of the present invention preferably contains an adipic acid unit in an amount of 50% by mol or more based on the linear aliphatic dicarboxylic acid units from the standpoint of the gas barrier property and the suitable thermal properties, such as the glass transition temperature and the melting point, of the polyamide compound. The linear aliphatic dicarboxylic acid unit in the polyamide compound of the present invention preferably contains a sebacic acid unit in an amount of 50% by mol or more based on the linear aliphatic dicarboxylic acid units from the standpoint of imparting suitable gas barrier property and molding suitability to the polyamide compound, and in the case where the polyamide compound is applied to such a purpose that requires low water absorbing property, weather resistance and heat resistance, the linear aliphatic dicarboxylic acid unit preferably contains a 1,12-dodecanedicarboxylic acid unit in an amount of 50% by mol or more based on the linear aliphatic dicarboxylic acid units.

1-2-2. Aromatic Dicarboxylic Acid Unit

The polyamide compound of the present invention preferably contains the aromatic dicarboxylic acid unit represented by the general formula (II-2) for imparting further gas barrier property to the polyamide compound, and for facilitating the moldability of a packaging material and a packaging container.

In the general formula (II-2), Ar represents an arylene group. The arylene group is preferably an arylene group having from 6 to 30 carbon atoms, and more preferably an arylene group having from 6 to 15 carbon atoms, and examples thereof include a phenylene group and a naphthylene group.

Examples of the compound capable of constituting the aromatic dicarboxylic acid unit represented by the general formula (II-2) include terephthalic acid, isophthalic acid and 2,6-naphthalenedicarboxylic acid, but are not limited thereto. These compounds may be used solely or as a combination of two or more kinds thereof.

The kind of the aromatic dicarboxylic acid unit represented by the general formula (II-2) may be appropriately determined depending on the purposes. The aromatic dicarboxylic acid unit in the polyamide compound of the present invention preferably contains at least one selected from the group consisting of an isophthalic acid unit, a terephthalic acid unit and a 2,6-naphthalenedicarboxylic acid unit, in an amount in total of 50% by mol or more based on the aromatic dicarboxylic acid units, and the content thereof is more preferably 70% by mol or more, further preferably 80% by mol or more, and particularly preferably 90% by mol or more, and is preferably 100% by mol or less. Among these units, isophthalic acid and/or terephthalic acid are preferably contained in the aromatic dicarboxylic acid unit. The content ratio of the isophthalic acid unit and the terephthalic acid unit (isophthalic acid unit/terephthalic acid unit) is not particularly limited and may be determined depending on the purposes. For example, from the standpoint of providing a suitable glass transition temperature and decreasing the crystallinity, the ratio is preferably from 0/100 to 100/0, more preferably from 0/100 to 60/40, further preferably from 0/100 to 40/60, and still further preferably from 0/100 to 30/70, with the total of both the units being 100.

1-3. Tertiary Hydrogen-containing Carboxylic Acid Unit

The tertiary hydrogen-containing carboxylic acid unit in the present invention has at least one each of an amino group and a carboxyl group, or has two or more of carboxyl groups, from the standpoint of the polymerization of the polyamide compound. Specific examples thereof include constitutional units represented by any one of the following general formulae (III), (IV) and (V):

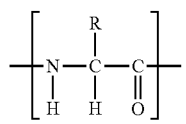

(III)

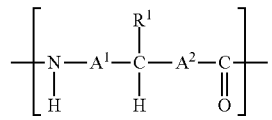

(IV)

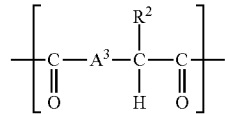

(V)

wherein, in the general formulae (III) to (V), R, $R^1$ and $R^2$ each represent a substituent, and $A^1$ to $A^3$ each represent a single bond or a divalent linking group, provided that the case where both $A^1$ and $A^2$ are single bonds in the general formula (IV) is excluded.

The polyamide compound of the present invention contains the tertiary hydrogen-containing carboxylic acid unit. Owing to the tertiary hydrogen-containing carboxylic acid unit contained as a copolymerization component, the polyamide compound of the present invention exhibits an excellent oxygen absorbing capability without a transition metal contained.

The mechanism where the polyamide compound containing the tertiary hydrogen-containing carboxylic acid unit exhibits a good oxygen absorbing capability in the present invention has not yet been clarified, but may be expected as follows. A compound capable of constituting the tertiary hydrogen-containing carboxylic acid unit has an electron withdrawing group and an electron donating group, both of which are bonded on the same carbon atom, and it is thus considered that a very stable radical is formed through a phenomenon referred to as the captodative effect where the unpaired electron present on the carbon atom is energetically stabilized. Specifically, the carboxyl group, which is an electron withdrawing group, makes electron deficient ($\delta^+$) the adjacent carbon having the tertiary hydrogen bonded thereto, and thus the tertiary hydrogen also becomes electron deficient ($\delta^+$), and is dissociated as a proton, thereby forming a radical. When oxygen and water are present therewith, it is considered that oxygen is reacted with the radical, and an oxygen absorbing capability is exhibited. It has been found that higher reactivity is obtained in an environment with a higher humidity and a higher temperature.

In the general formulae (III) to (V), R, $R^1$ and $R^2$ each represent a substituent. Examples of the substituent represented by R, $R^1$ and $R^2$ include a halogen atom (such as a chlorine atom, a bromine atom and an iodine atom), an alkyl group (such as a linear, branched or cyclic alkyl group having from 1 to 15 carbon atoms, and preferably from 1 to 6 carbon atoms, e.g., a methyl group, an ethyl group, a n-propyl group, an isopropyl group, a t-butyl group, a n-octyl group, a 2-ethylhexyl group, a cyclopropyl group and a cyclopentyl group), an alkenyl group (such as a linear, branched or cyclic alkenyl group having from 2 to 10 carbon atoms, and preferably from 2 to 6 carbon atoms, e.g., a vinyl group and an allyl group), an alkynyl group (such as an alkynyl group having from 2 to 10 carbon atoms, and preferably from 2 to 6 carbon atoms, e.g., an ethynyl group and a propargyl group), an aryl group (such as an aryl group having from 6 to 16 carbon atoms, and preferably from 6 to 10 carbon atoms, e.g., a phenyl group and a naphthyl group), a heterocyclic group (such as a monovalent group having from 1 to 12 carbon atoms, and preferably from 2 to 6 carbon atoms, which is obtained by removing one hydrogen atom from a 5-membered or 6-membered aromatic or nonaromatic heterocyclic compound, e.g., a 1-pyrazolyl group, a 1-imidazolyl group and a 2-furyl group), a cyano group, a hydroxyl group, a nitro group, an alkoxy group (such as a linear, branched or cyclic alkoxy group having from 1 to 10 carbon atoms, and preferably from 1 to 6 carbon atoms, e.g., a methoxy group and an ethoxy group), an aryloxy group (such as an aryloxy group having from 6 to 12 carbon atoms, and preferably from 6 to 8 carbon atoms, e.g., a phenoxy group), an acyl group (such as a formyl group, an alkylcarbonyl group having from 2 to 10 carbon atoms, and preferably from 2 to 6 carbon atoms, and an arylcarbonyl group having from 7 to 12 carbon atoms, and preferably from 7 to 9 carbon atoms, e.g., an acetyl group, a pivaloyl group and a benzoyl group), an amino group (such as an amino group, an alkylamino group having from 1 to 10 carbon atoms, and preferably from 1 to 6 carbon atoms, an anilino group having from 6 to 12 carbon atoms, and preferably from 6 to 8 carbon atoms, and a heterocyclic amino group having from 1 to 12 carbon atoms, and preferably from 2 to 6 carbon atoms, e.g., an amino group, a methylamino group and an anilino group), a mercapto group, an alkylthio group (such as an alkylthio group having from 1 to 10 carbon atoms, and preferably from 1 to 6 carbon atoms, e.g., a methylthio group and an ethylthio group), an arylthio group (such as an arylthio group having from 6 to 12 carbon atoms, and preferably from 6 to 8 carbon atoms, e.g., a phenylthio group), a heterocyclic thio group (such as a heterocyclic thio group having from 2 to 10 carbon atoms, and preferably from 1 to 6 carbon atoms, e.g., a 2-benzothiazolylthio group), and an imide group (such as an imide group having from 2 to 10 carbon atoms, and preferably from 4 to 8 carbon atoms, e.g., an N-succinimide group and an N-phthalimide group).

Among these functional groups, those having a hydrogen atom may be further substituted by the aforementioned groups, and examples thereof include an alkyl group substituted with a hydroxyl group (such as a hydroxyethyl group), an alkyl group substituted with an alkoxy group (such as a methoxyethyl group), an alkyl group substituted with an aryl group (such as a benzyl group), an aryl group substituted with an alkyl group (such as a p-tolyl group) and an aryloxy group substituted with an alkyl group (such as a 2-methylphenoxy group), but are not limited thereto.

In the case where the functional group is further substituted, the number of carbon atoms mentioned above does not contain the number of carbon atoms of the further substituent. For example, a benzyl group is considered as an alkyl group having one carbon atom substituted with a phenyl group, but is not considered as an alkyl group having 7 carbon atoms substituted with a phenyl group. The numbers of carbon atoms described hereinbelow are to be similarly understood unless otherwise indicated.

In the general formulae (IV) and (V), $A^1$ to $A^3$ each represent a single bond or a divalent linking group. In the general formula (IV), the case where both $A^1$ and $A^2$ are single bonds is excluded. Examples of the divalent linking group include a linear, branched or cyclic alkylene group (such as an alkylene group having from 1 to 12 carbon atoms, and preferably from 1 to 4 carbon atoms, e.g., a methylene group and an ethylene group), an aralkylene group (such as an aralkylene group having from 7 to 30 carbon atoms, and preferably from 7 to 13 carbon atoms, e.g., a benzylidene group) and an arylene group (such as an arylene group having from 6 to 30 carbon atoms, and preferably from 6 to 15 carbon atoms, e.g., a phenylene group). These groups may further have a substituent, and examples of the substituent include those exemplified as the functional groups for R, $R^1$ and $R^2$. Examples thereof include an arylene group substituted with an alkyl group (such as a xylylene group), but are not limited thereto.

The polyamide compound of the present invention preferably contains at least one kind of the constitutional units represented by any one of the general formulae (III), (IV) and (V). Among these, a carboxylic acid unit having tertiary hydrogen on an α-carbon (a carbon atom that is adjacent to the carboxyl group) is preferred, and a constitutional unit represented by the general formula (III) is particularly preferred from the standpoint of the availability of the raw material and the enhancement of the oxygen absorbing capability.

The substituent R in the general formula (III) has been described above, and among them, a substituted or unsubstituted alkyl group and a substituted or unsubstituted aryl group are preferred, a substituted or unsubstituted alkyl group having from 1 to 6 carbon atoms and a substituted or unsubstituted aryl group having from 6 to 10 carbon atoms are more preferred, and a substituted or unsubstituted alkyl group having from 1 to 4 carbon atoms and a substituted or unsubstituted phenyl group are particularly preferred.

Preferred examples of R include a methyl group, an ethyl group, a n-propyl group, an isopropyl group, a n-butyl group, a t-butyl group, a 1-methylpropyl group, a 2-methylpropyl group, a hydroxymethyl group, a 1-hydroxyethyl group, a mercaptomethyl group, a methylsulfanylethyl group, a phenyl group, a naphthyl group, a benzyl group and a 4-hydroxybenzyl group, but are not limited thereto. Among these, a methyl group, an ethyl group, a 2-methylpropyl group and a benzyl group are more preferred.

Examples of the compound capable of constituting the constitutional unit represented by the general formula (III) include α-amino acids such as alanine, 2-aminobutyric acid, valine, norvaline, leucine, norleucine, tert-leucine, isoleucine, serine, threonine, cysteine, methionine, 2-phenylglycine, phenylalanine, tyrosine, histidine, tryptophan and proline, but are not limited thereto.

Examples of the compound capable of constituting the constitutional unit represented by the general formula (IV) include β-amino acids such as 3-aminobutyric acid, and examples of the compound capable of constituting the constitutional unit represented by the general formula (V) include dicarboxylic acids such as methylmalonic acid, methylsuccinic acid, malic acid and tartaric acid, but are not limited thereto.

These compounds may be a D-isomer, an L-isomer or a racemic substance, and may also be an allo-isomer. These compounds may be used solely or as a combination of two or more kinds thereof.

Among these, an α-amino acid having tertiary hydrogen on an α-carbon is particularly preferred from the standpoint of the availability of the raw material, the enhancement of the oxygen absorbing capability and the like. In the α-amino acid, alanine is most preferred from the standpoint of the availability, the low cost, the easiness of polymerization, and the low yellowness index (YI) of the polymer. Alanine has a relatively low molecular weight and thus exhibits a high polymerization ratio per 1 g of the polyamide compound of the present invention, and therefore, alanine provides a good oxygen absorbing capability per 1 g of the polyamide compound.

The purity of the compound capable of constituting the tertiary hydrogen-containing carboxylic acid unit is preferably 95% or more, more preferably 98.5% or more, and further preferably 99% or more, from the standpoint of the influence on polymerization such as delay of the polymerization rate, and the influence on the product quality such as the yellowness index of the polymer. The amount of a sulfate ion and an ammonium ion contained as impurities is preferably 500 ppm or less, more preferably 200 ppm or less, and further preferably 50 ppm or less.

1-4. ω-Aminocarboxylic Acid Unit

The polyamide compound of the present invention may further contain an ω-aminocarboxylic acid unit represented by the following general formula (A), in addition to the diamine unit, the dicarboxylic acid unit and the tertiary hydrogen-containing carboxylic acid unit, in the case where the polyamide compound requires flexibility or the like.

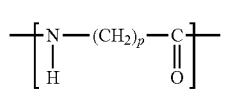

wherein, in the general formula (A), p represents an integer of from 2 to 18.

The content of the ω-aminocarboxylic acid unit is preferably from 0.1 to 49.9% by mol, more preferably from 3 to 40% by mol, and further preferably from 5 to 35% by mol, based on the total constitutional units of the polyamide compound. The total content of the diamine unit, the dicarboxylic acid unit, the tertiary hydrogen-containing carboxylic acid unit and the ω-aminocarboxylic acid unit does not exceed 100% by mol.

In the general formula (A), p represents an integer of from 2 to 18, preferably from 3 to 16, more preferably from 4 to 14, and further preferably from 5 to 12.

Examples of the compound capable of constituting the ω-aminocarboxylic acid unit represented by the following general formula (A) include an ω-aminocarboxylic acid having from 5 to 19 carbon atoms and a lactam having from 5 to 19 carbon atoms. Examples of the ω-aminocarboxylic acid having from 5 to 19 carbon atoms include 6-aminohexanoic acid and 12-aminododecanoic acid, and examples of the lactam having from 5 to 19 carbon atoms include ω-caprolactam and laurolactam, but are not limited thereto. These compounds may be used solely or as a combination of two or more kinds thereof.

The ω-aminocarboxylic acid unit preferably contains a 6-aminohexanoic acid unit and/or a 12-aminododecanoic acid unit in an amount in total of 50% by mol or more based on the ω-aminocarboxylic acid units, and the content thereof is more preferably 70% by mol or more, more preferably 80% by mol or more, and further preferably 90% by mol or more, and is preferably 100% by mol or less.

1-5. Polymerization Degree of Polyamide Compound

With respect to the polymerization degree of the polyamide compound of the present invention, a relative viscosity is used. The polyamide compound of the present invention preferably has a relative viscosity of from 1.01 to 4.2.

In the case where the polyamide compound of the present invention is a polyamide resin, the relative viscosity thereof is preferably from 1.8 to 4.2, more preferably from 1.9 to 4.0, and further preferably from 2.0 to 3.8, from the standpoint of the appearance and the molding processability of the molded article. The relative viscosity thereof is not limited to the range in the case where the polyamide resin of the present invention is used as an additive or a modifier of another thermoplastic resin.

In the case where the polyamide compound of the present invention is a polyamide oligomer, the relative viscosity thereof is preferably 1.01 or more and less than 1.8, more preferably from 1.1 to 1.75, further preferably from 1.2 to 1.65, and particularly preferably from 1.3 to 1.6, from the standpoint of the handle ability, reactivity and heat stability.

The relative viscosity referred herein is a ratio of the fall time (t) of the polyamide compound measured by dissolving 1 g of the polyamide compound in 100 mL of 96% sulfuric acid and measuring the resulting solution with a Cannon-Fenske viscometer at 25° C., and the fall time ($t_0$) of 96% sulfuric acid measured in the same manner, and shown by the following expression.

Relative viscosity=$t/t_0$ 1-6. Terminal Amino Group Concentration

The oxygen absorption rate of the polyamide compound and the oxidative degradation of the polyamide compound due to oxygen absorption may be controlled by changing the terminal amino group concentration of the polyamide compound. In the case where the polyamide compound is a polyamide resin, the terminal amino group concentration is preferably in a range of from 5 to 150 eq/$10^6$ g, more preferably from 10 to 100 eq/$10^6$ g, and further preferably from 15 to 80 eq/$10^6$ g, from the standpoint of the balance between the oxygen absorption rate and the oxidative degradation.

2. Production Method of Polyamide Compound

The polyamide compound of the present invention may be produced by polycondensation of a diamine component capable of constituting the diamine unit, a dicaroxylic acid component capable of constituting the dicarboxylic acid unit, a tertiary hydrogen-containing carboxylic acid component capable of constituting the tertiary hydrogen-containing carboxylic acid component, and depending on necessity, an ω-aminocarboxylic acid component capable of constituting the ω-aminocarboxylic acid unit. The polymerization degree thereof may be controlled by adjusting the polycondensation conditions and the like. As a molecular weight controlling agent, a small amount of a monoamine and a monocarboxylic acid may be added upon polycondensation. Furthermore, for providing an intended polymerization degree by suppressing the polycondensation reaction, the ratio (molar ratio) of the diamine component and the carboxylic acid component constituting the polyamide compound may be deviated from 1.

Examples of the polycondensation method of the polyamide compound of the present invention include a reactive extrusion method, a pressurized salt method, an atmospheric dropping method and a pressurized dropping method, but are not limited thereto. The reaction temperature is preferably as low as possible, and thereby the polyamide compound may be prevented from suffering yellowing or gelation, and the polyamide compound having stable properties may be obtained.

2-1. Reactive Extrusion Method

In the reactive extrusion method, a polyamide prepared from the diamine component and the dicarboxylic acid component (i.e., a polyamide corresponding to a precursor of the polyamide compound of the present invention) or a polyamide prepared from the diamine component, the dicarboxylic acid component and the ω-aminocarboxylic acid component (i.e., a polyamide corresponding to a precursor of the polyamide compound of the present invention) is reacted with the tertiary hydrogen-containing carboxylic acid component by melt-kneading in an extruder. In this method, the tertiary hydrogen-containing carboxylic acid component is incorporated into the skeleton of the polyamide through amide exchange reaction, and for performing the reaction sufficiently, it is preferred to use a screw suitable for the reactive extrusion and a twin screw extruder having a large L/D ratio.

This method is convenient and suitable for producing the polyamide compound that contains a small amount of the tertiary hydrogen-containing carboxylic acid unit.

2-2. Pressurized Salt Method

In the pressurized salt method, a nylon salt as a raw material is subjected to melt polycondensation under increased pressure. Specifically, a nylon salt aqueous solution containing the diamine component, the dicarboxylic acid component, the tertiary hydrogen-containing carboxylic acid component, and depending on necessity the ω-aminocarboxylic acid component is prepared, and then the aqueous solution is concentrated and then subjected to polycondensation by increasing the temperature thereof under increased pressure while removing condensation water. While returning the inside of the reaction vessel gradually to the atmospheric pressure, the temperature is increased to a temperature higher by approximately 10° C. than the melting point of the polyamide compound and maintained, and then while the pressure is decreased gradually to 0.02 MPaG, the temperature is maintained for continuously performing the polycondensation. After reaching the agitation torque to a constant value, the inside of the reaction vessel is pressurized with nitrogen to approximately 0.3 MPaG, thereby recovering the polyamide compound.

The pressurized salt method is useful in the case where a volatile component is used as a monomer, and is a preferred polycondensation method in the case where the copolymerization ratio of the tertiary hydrogen-containing carboxylic acid component is large. The method is particularly preferred for producing the polyamide resin (A) containing the tertiary hydrogen-containing carboxylic acid unit in an amount of 15% by mol or more based on the total constitutional units of the polyamide compound. The use of the pressurized salt method prevents the tertiary hydrogen-containing carboxylic acid component from evaporating, and furthermore prevents the tertiary hydrogen-containing carboxylic acid component from undergoing polycondensation solely, and thus the polycondensation reaction can be smoothly performed, thereby providing the polyamide compound having excellent properties.

2-3. Atmospheric Dropping Method

In the atmospheric dropping method, the diamine component is continuously added dropwise to a mixture obtained by melting under heat the dicarboxylic acid component, the tertiary hydrogen-containing carboxylic acid component, and depending on necessity, the ω-aminocarboxylic acid component, thereby performing the polycondensation while removing condensation water. The polycondensation reaction is performed under heating the reaction system, thereby preventing the reaction temperature from becoming lower than the melting point of the polyamide compound produced.

As compared to the pressurized salt method, the atmospheric dropping method provides a larger yield per batch because no water for dissolving the salt is used, and undergoes less decrease in reaction rate because vaporization and condensation of the raw material components, thereby shortening the process time.

2-4. Pressurized Dropping Method

In the pressurized dropping method, the dicarboxylic acid component, the tertiary hydrogen-containing carboxylic acid component, and depending on necessity, the ω-aminocarboxylic acid component are charged in a polycondensation vessel, and the components are melt-mixed by agitation to prepare a mixture. Subsequently, while pressurizing the inside of the vessel to approximately from 0.3 to 0.4 MPaG, the diamine component is continuously added dropwise to the mixture, thereby performing the polycondensation while removing condensation water. At this time, the polycondensation reaction is performed under heating the reaction system, thereby preventing the reaction temperature from becoming lower than the melting point of the polyamide compound produced. After reaching the prescribed molar ratio, the dropwise addition of the diamine component is terminated. Then, while returning the inside of the vessel gradually to the atmospheric pressure, the temperature is increased to a temperature higher by approximately 10° C. than the melting point of the polyamide compound and maintained, and then while the pressure is decreased gradually to 0.02 MPaG, the temperature is maintained for continuously performing the polycondensation. After reaching the agitation torque to a constant value, the inside of the vessel is pressurized with nitrogen to approximately 0.3 MPaG, thereby recovering the polyamide compound.

As similar to the pressurized salt method, the pressurized dropping method is useful in the case where a volatile component is used as a monomer, and is a preferred polycondensation method in the case where the copolymerization ratio of the tertiary hydrogen-containing carboxylic acid component is large. The method is particularly preferred for producing the polyamide compound containing the tertiary hydrogen-containing carboxylic acid unit in an amount of 15% by mol or more based on the total constitutional units of the polyamide compound. The use of the pressurized dropping method prevents the tertiary hydrogen-containing carboxylic acid component from evaporating, and furthermore prevents the tertiary hydrogen-containing carboxylic acid component from undergoing polycondensation solely, and thus the polycondensation reaction can be smoothly performed, thereby providing the polyamide compound having excellent properties. Moreover, as compared to the pressurized salt method, the pressurized dropping method provides a larger yield per batch because no water for dissolving the salt is used, and can shorten the reaction time as similar to the atmospheric dropping method, thereby providing the polyamide compound with a low yellowness index through prevention of gelation or the like.

2-5. Step of Increasing Polymerization Degree

The polyamide compound thus produced by the aforementioned polycondensation methods may be used as it is, or may further be subjected to a step of further increasing the polymerization degree. Examples of the step of further increasing the polymerization degree include reactive extrusion in an extruder and solid phase polymerization. Preferred examples of a heating device used for solid phase polymerization include a continuous heating and drying device, a rotation drum heating device which is referred to as a tumble dryer, a conical dryer and a rotary dryer, and a conical heating device having a rotary blade inside the device which is referred to as a Nauta mixer, but are not limited thereto, and known methods and devices may be used. Particularly in the case where the polyamide compound is subjected to solid phase polymerization, the rotation drum heating device is preferred among the above devices since the system can be sealed, and thereby the polycondensation can be performed in a state where oxygen causing coloration is removed.

2-6. Phosphorus Atom-containing Compound and Alkali Metal Compound

In the polycondensation of the polyamide compound of the present invention, a phosphorus atom-containing compound is preferably added from the standpoint of acceleration of the amidation reaction.

Examples of the phosphorus atom-containing compound include a phosphinic acid compound, such as dimethylphosphinic acid and phenylmethylphosphinic acid; a hypophosphorous acid compound, such as hypophosphorous acid, sodium hypophosphite, potassium hypophosphite, lithium hypophosphite, magnesium hypophosphite, calcium hypophosphite and ethyl hypophosphite; a phosphonic acid compound, such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate and potassium ethylphosphonate; a phosphonous acid compound, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite and ethyl phenylphosphonite; and a phosphorous acid compound, such as phosphorous acid, sodium hydrogen phosphite, sodium phosphite, lithium phosphite, potassium phosphite, magnesium phosphite, calcium phosphite, triethyl phosphite, triphenyl phosphite and pyrophosphorous acid.

Among these, a metal salt of hypophosphorous acid, such as sodium hypophosphite, potassium hypophosphite and lithium hypophosphite, is preferably used since it greatly accelerates the amidation reaction and is excellent in prevention of coloration, and sodium hypophosphite is particularly preferred. The phosphorus atom-containing compound that can be used in the present invention is not limited to these compounds.

The amount of the phosphorus atom-containing compound added is preferably from 0.1 to 1,000 ppm, more preferably from 1 to 600 ppm, and further preferably from 5 to 400 ppm, in terms of phosphorus atom concentration in the polyamide compound. When the amount thereof is 0.1 ppm or more, the polyamide compound is hard to be colored during the polymerization, thereby providing high transparency. When the amount thereof is 1,000 ppm or less, the polyamide compound is hard to be gelled, and fish eyes, which are considered to be caused by the phosphorus atom containing compound, can be suppressed from being contained in a molded article, thereby providing a molded article with a good appearance.

In the polycondensation system of the polyamide compound, an alkali metal compound is preferably added in combination with the phosphorus atom-containing compound. For preventing the polyamide compound from being colored during the polycondensation, the phosphorus atom-containing compound is necessarily present in a sufficient amount, but it may cause gelation of the polyamide compound in some cases, and therefore, an alkali metal compound is preferably used in combination therewith for controlling the amidation reaction rate.

Preferred examples of the alkali metal compound include an alkali metal hydroxide, an alkali metal acetate salt, an alkali metal carbonate salt and an alkali metal alkoxide. Specific examples of the alkali metal compound capable of being used in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide and sodium carbonate. The alkali metal compound may be used without limitation to these compounds. The ratio of the phosphorus atom-containing compound and the alkali metal compound, phosphorus atom-containing compound/alkali metal compound, is preferably from 1.0/0.05 to 1.0/1.5, more preferably from 1.0/0.1 to 1.0/1.2, and further preferably from 1.0/0.2 to 1.0/1.1, from the standpoint of controlling the polymerization rate and lowering the yellowness index.

3. Polyamide Composition

To the polyamide compound of the present invention, additives may be added depending on the required purposes and capabilities, such as a lubricant, a crystallization nucleating agent, a whitening preventing agent, a matting agent, a heat resistant stabilizer, a weather resistant stabilizer, an ultraviolet ray absorbent, a plasticizer, a flame retardant, an antistatic agent, a coloration preventing agent, an antioxidant and an impact resistance improving agent, thereby forming a polyamide composition. The additives may be added depending on necessity in such a range that does not impair the advantages of the present invention. The polyamide compound of the present invention may also be mixed with various kinds of resins depending on the required purposes and capabilities, thereby forming a polyamide composition. In the polyamide composition, the polyamide resin or the polyamide oligomer may be reacted with the additives or the resins added.

The polyamide compound of the present invention and the additive may be mixed by a known method, and a dry mixing method is preferably employed since it may be performed at low cost and without thermal history. For example, the polyamide compound and the additive are placed in a tumbler, which is then rotated for mixing them. In the present invention, such a mixing method may be employed that a viscous liquid as a spreading agent is attached to the polyamide compound for preventing classification of the polyamide compound and the additive after dry mixing, and then the additive is added and mixed therewith. Examples of the spreading agent include a surfactant, but are not limited thereto, and known ones may be used.

3-1. Whitening Preventing Agent

In the polyamide composition containing the polyamide compound of the present invention, a diamide compound and/or a diester compound is preferably added to the polyamide compound for preventing whitening after subjecting to a hydrothermal treatment or after elapse of a prolonged period of time. The diamide compound and/or the diester compound are effective for prevention of whitening due to deposition of the oligomer. The diamide compound and the diester compound may be used solely or as a combination thereof.

Preferred examples of the diamide compound include a diamide compound obtained with an aliphatic dicarboxylic acid having from 8 to 30 carbon atoms and a diamine having from 2 to 10 carbon atoms. The whitening prevention effect is expected with an aliphatic dicarboxylic acid having 8 or more carbon atoms and a diamine having 2 or more carbon atoms. The diamide compound may be favorably dispersed uniformly in the resin composition with an aliphatic dicarboxylic acid having 30 or less carbon atoms and a diamine having 10 or less carbon atoms. The aliphatic dicarboxylic acid may have a side chain and a double bond, but a linear saturated aliphatic dicarboxylic acid is preferred. The diamide compound may be used solely with one kind or as a combination of two or more kinds thereof.

Examples of the aliphatic dicarboxylic acid include stearic acid (C18), eicosanoic acid (C20), behenic acid (C22), montanic acid (C28) and triacontanoic acid (C30). Examples of the diamine include ethylenediamine, butylenediamine, hexanediamine, xylylenediamine and bis(aminomethyl)cyclohexane. The diamide compound that is obtained by combining these compounds is preferred.

A diamide compound obtained with an aliphatic dicarboxylic acid having from 8 to 30 carbon atoms and a diamine mainly containing ethylene diamine, and a diamine compound obtained with an aliphatic dicarboxylic acid mainly containing montanic acid and a diamine having from 2 to 10 carbon atoms are preferred, and a diamine compound obtained with an aliphatic dicarboxylic acid mainly containing stearic acid and a diamine mainly containing ethylenediamine is particularly preferred.

Preferred examples of the diester compound include a diester compound obtained with an aliphatic dicarboxylic acid having from 8 to 30 carbon atoms and a diol having from 2 to 10 carbon atoms. The whitening prevention effect is expected with an aliphatic dicarboxylic acid having 8 or more carbon atoms and a diamine having 2 or more carbon atoms. The diester compound may be favorably dispersed uniformly in the resin composition with an aliphatic dicarboxylic acid having 30 or less carbon atoms and a diol having 10 or less carbon atoms. The aliphatic dicarboxylic acid may have a side chain and a double bond, but a linear saturated aliphatic dicarboxylic acid is preferred. The diester compound may be used solely with one kind or as a combination of two or more kinds thereof.

Examples of the aliphatic dicarboxylic acid include stearic acid (C18), eicosanoic acid (C20), behenic acid (C22), montanic acid (C28) and triacontanoic acid (C30). Examples of the diol component of the diester compound used in the present invention include ethylene glycol, propanediol, butanediol, hexanediol, xylylene glycol and cyclohexanedimethanol. The diester compound that is obtained by combining these compounds is preferred.

A diester compound obtained with an aliphatic dicarboxylic acid mainly containing montanic acid and a diol mainly containing ethylene glycol and/or 1,3-butanediol is particularly preferred.

The amount of the diamide compound and/or the diester compound added may be from 0.005 to 0.5 parts by mass, preferably from 0.05 to 0.5 parts by mass, and particularly preferably from 0.12 to 0.5 parts by mass, per 100 parts by mass of the polyamide compound. When these compounds are added in an amount of 0.005 parts by mass or more per 100 parts by mass of the polyamide compound, and a crystallization nucleating agent is used in combination, a synergistic effect of whitening prevention may be expected. When the amount is 0.5 parts by mass or less per 100 parts by mass of the polyamide compound, a molded article obtained by molding the polyamide compound of the present invention may have a clouding point maintained at a low level.

3-2. Crystallization Nucleating Agent

To the polyamide composition containing the polyamide compound of the present invention, a crystallization nucleating agent is preferably added from the standpoint of improvement of transparency. The crystallization nucleating agent is effective not only to improvement of transparency, but also to whitening caused by crystallization after subjecting to a hydrothermal treatment or after elapse of a prolonged period of time, and the addition of the crystallization nucleating agent to the polyamide compound may suppress the spherulite size to ½ or less of the wavelength of visible light. The combination use of the diamide compound and/or the diester compound and the crystallization nucleating agent provides, owing to the synergistic effect thereof, such whitening prevention that is far greater than that expected from the whitening prevention effects obtained from each of them.

Examples of the crystallization nucleating agent of inorganic series include ones that are ordinarily used in a thermoplastic resins, for example, a glass filler (such as glass fibers, pulverized glass fibers (milled fibers), glass flakes and glass beads), a calcium silicate filler (such as wollastonite), mica, talc (such as powder talc and granular talc containing rosin as a binder), kaolin, potassium titanate whiskers, boron nitride, clay, such as a layered silicate, nanofillers, and carbon fibers, and two or more kinds thereof may be used in combination. The inorganic crystallization nucleating agent preferably has a maximum diameter of from 0.01 to 5 µm. In particular, powder talc having a particle diameter of 3.0 µm or less is preferred, powder talc having a particle diameter of approximately from 1.5 to 3.0 µm is more preferred, and powder talc having a particle diameter of 2.0 µm or less is particularly preferred. Granular talc obtained by adding rosin as a binder to the powder talc is particularly preferred since it is dispersed in good condition in the polyamide composition. Preferred examples of the crystallization nucleating agent of organic series include capsules with a two-molecule membrane in microlevel size to nanolevel size containing the crystallization nucleating agent, a bis(benzylidene) sorbitol transparent crystallization nucleating agent, a phosphorus transparent crystallization nucleating agent, and a gelation agent, such as a rosin amide gelation agent, and a bis(benzylidene) sorbitol crystallization nucleating agent is particularly preferred.

The amount of the crystallization nucleating agent added is preferably from 0.005 to 2.0 parts by mass, and particularly preferably from 0.01 to 1.5 parts by mass, per 100 parts by mass of the polyamide compound. By adding at least one crystallization nucleating agent is added to the polyamide compound in combination with the diamide compound and/or the diester compound, a synergistic effect of whitening prevention may be obtained. In particular, the inorganic crystallization nucleating agent, such as talc, is preferably added in an amount of from 0.05 to 1.5 parts by mass per 100 parts by mass of the polyamide compound, and the organic crystallization nucleating agent, such as a bis(benzylidene) sorbitol crystallization nucleating agent, is preferably added in an amount of from 0.01 to 0.5 parts by mass per 100 parts by mass of the polyamide compound.

The bis(benzylidene) sorbitol crystallization nucleating agent is one selected from bis(benzylidene) sorbitol and a bis(alkylbenzylidene) sorbitol, which is a condensation product formed through acetalization reaction between sorbitol and benzaldehyde or an alkyl-substituted benzaldehyde (i.e., a diacetal compound), and can be favorably prepared according to various synthesis methods known in this field of art. The alkyl herein may be linear or cyclic and may be saturated or unsaturated. According to the general synthesis method, reaction between 1 mol of D-sorbitol and approximately 2 mol of aldehyde in the presence of an acid catalyst is employed. The reaction temperature varies widely depending on the characteristics (such as the melting point) of the aldehyde used as the starting material of the reaction. The reaction medium may be an aqueous medium or a non-aqueous medium. One preferred example of the method for preparing the diacetal is disclosed in U.S. Pat. No. 3,721,682. The disclosure therein is limited to a benzylidene sorbitol, but a bis(alkylbenzylidene) sorbitol used in the present invention may also be favorably produced by the method disclosed therein.

Specific examples of the bis(benzylidene) sorbitol crystallization nucleating agent (i.e., the diacetal compound) include bis(p-methylbenzylidene) sorbitol, bis(p-ethylbenzylidene) sorbitol, bis(n-propylbenzylidene) sorbitol, bis(p-isopropylbenzylidene) sorbitol, bis(p-isobutylbenzylidene) sorbitol, bis(2,4-dimethylbenzylidene) sorbitol, bis(3,4-dimethylbenzylidene) sorbitol, bis(2,4,5-trimethylbenzylidene) sorbitol, bis(2,4,6-trimethylbenzylidene) sorbitol and bis(4-biphenylbenzylidene) sorbitol.

Examples of the alkyl-substituted benzaldehyde that is preferred for preparing the bis(benzylidene) sorbitol crystallization nucleating agent include p-methylbenzaldehyde, n-propylbenzaldehyde, p-isopropylbenzaldehyde, 2,4-dimethylbenzaldehyde, 3,4-dimethylbenzaldehyde, 2,4,5-trimethylbenzaldehyde, 2,4,6-trimethylbenzaldehyde and 4-biphenylbenzaldehyde.

By adding a crystallization nucleating agent, such as talc, mica and clay, to the polyamide compound, the crystallization rate is accelerated by twice or more as compared to the polyamide compound having no crystallization nucleating agent added. There may be no problem in the purpose of injection molding requiring a high molding cycle, but when the crystallization rate is too large in producing a stretched film or a deep drawn cup molded from a sheet, the film or sheet may not be stretched due to crystallization, and the moldability is considerably deteriorated due to breakage and uneven elongation. However, the bis(benzylidene) sorbitol crystallization nucleating agent does not accelerate the crystallization rate even upon adding to the polyamide compound, and thus is preferred upon using as a stretched film or a deep drawn cup molded from a sheet.

It has also been found that the bis(benzylidene) sorbitol crystallization nucleating agent not only prevents whitening, but also enhances the oxygen barrier property upon adding to the polyamide compound. The use of the bis(benzylidene) sorbitol (A) crystallization nucleating agent is particularly preferred since both whitening prevention and enhancement of the oxygen barrier property are obtained.

The polyamide composition containing the polyamide compound of the present invention that contains a layered silicate may be used as a gas barrier layer, and can enhance not only the oxygen barrier property of the molded article, but also the barrier property to other gases, such as carbon dioxide gas, thereof.

The layered silicate is a di-octahedral or tri-octahedral layered silicate having a charge density of from 0.25 to 0.6, examples of the di-octahedral one include montmorillonite and beidellite, and examples of the tri-octahedral one include hectorite and saponite. Among these, montmorillonite is preferred.

The layered silicate is preferably made in contact with an organic swelling agent, such as a polymer compound and an organic compound, in advance, thereby expanding the layers of the layered silicate. Preferred examples of the organic swelling agent include a tertiary ammonium salt, and a tertiary ammonium salt having at least one alkyl or alkenyl group having 12 or more carbon atoms is preferably used.

Specific examples of the organic swelling agent include a trimethyl alkyl ammonium salt, such as a trimethyl dodecyl ammonium salt, a trimethyl tetradecyl ammonium salt, a trimethyl hexadecyl ammonium salt, a trimethyl octadecyl ammonium salt and a trimethyl eicosyl ammonium salt; a trimethyl alkenyl ammonium salt, such as a trimethyl octadecenyl ammonium salt and a trimethyl octadecadienyl ammonium salt; a triethyl alkyl ammonium salt, such as a triethyl dodecyl ammonium salt, a triethyl tetradecyl ammonium salt, a triethyl hexadecyl ammonium salt and a triethyl octadecyl ammonium salt; a tributyl alkyl ammonium salt, such as a tributyl dodecyl ammonium salt, a tributyl tetradecyl ammonium salt, a tributyl hexadecyl ammonium salt and a tributyl octadecyl ammonium salt; a dimethyl dialkyl ammonium salt, such as a dimethyl didodecyl ammonium salt, a dimethyl ditetradecyl ammonium salt, a dimethyl dihexadecyl ammonium salt, a dimethyl dioctadecyl ammonium salt and a dimethyl ditallow ammonium salt; a dimethyl dialkenyl ammonium salt, such as a dimethyl dioctadecenyl ammonium salt and a dimethyl dioctadecadienyl ammonium salt; a diethyl dialkyl ammonium salt, such as a diethyl didodecyl ammonium salt, a diethyl ditetradecyl ammonium salt, a diethyl dihexadecyl ammonium salt and a diethyl dioctadecyl ammonium salt; a dibutyl dialkyl ammonium salt, such as a dibutyl didodecyl ammonium salt, a dibutyl ditetradecyl ammonium salt, a dibutyl dihexadecyl ammonium salt and a dibutyl dioctadecyl ammonium salt; a methyl benzyl dialkyl ammonium salt, such as a methyl benzyl dihexadecyl ammonium salt; a dibenzyl dialkyl ammonium salt, such as dibenzyl dihexadecyl ammonium salt; a trialkyl methyl ammonium salt, such as a tridecyl methyl ammonium salt, a tritetradecyl methyl ammonium salt and a trioctadecyl methyl ammonium salt; a trialkyl ethyl ammonium salt, such as a tridodecyl ethyl ammonium salt; a trialkyl butyl ammonium salt, such as a tridodecyl butyl ammonium salt; and an ω-amino acid, such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid and 18-aminooctadecanoic acid. An ammonium salt containing a hydroxyl group and/or an ether group may also be used as the organic swelling agent, and particularly a tertiary ammonium salt containing at least one alkylene glycol residual group, such as a methyl dialkyl (PAG) ammonium salt, an ethyl dialkyl (PAG) ammonium salt, a butyl dialkyl (PAG) ammonium salt, a dimethyl bis (PAG) ammonium salt, a diethyl bis(PAG) ammonium salt, a dibutyl bis(PAG) ammonium salt, a methyl alkyl bis(PAG) ammonium salt, an ethyl alkyl bis(PAG) ammonium salt, a butyl alkyl bis(PAG) ammonium salt, a methyl tri(PAG) ammonium salt, an ethyl tri(PAG) ammonium salt, a butyl tri(PAG) ammonium salt and a tetra(PAG) ammonium salt (wherein the alkyl means an alkyl group having 12 or more carbon atoms, such as dodecyl, tetradecyl, hexadecyl, octadecyl and eicosyl, and PAG means a polyalkylene glycol residual group, and preferably a polyethylene glycol residual group or a polypropylene glycol residual group each having 20 or less carbon atoms), may also be used as the organic swelling agent. Among these, a trimethyl dodecyl ammonium salt, a trimethyl tetradecyl ammonium salt, a trimethyl hexadecyl ammonium salt, a trimethyl octadecyl ammonium salt, a dimethyl didodecyl ammonium salt, a dimethyl ditetradecyl ammonium salt, a dimethyl dihexadecyl ammonium salt, a dimethyl dioctadecyl ammonium salt and a dimethyl ditallow ammonium salt are preferred. The organic swelling agent may be used solely or as a mixture of plural kinds thereof.

In the present invention, the polyamide compound containing from 0.5 to 8 parts by mass of the layered silicate having been treated with the organic swelling agent added per 100 parts by mass of the polyamide compound is preferably used, and the amount of the layered silicate is more preferably from 1 to 6 parts by mass, and more preferably from 2 to 5 parts by mass. When the amount of the layered silicate added is less than 0.5 parts by mass, the improvement in gas barrier property may be unfavorably small. When the amount thereof exceeds 8 parts by mass, the gas barrier layer may be turbid, thereby impairing the transparency of the container unfavorably.

In the polyamide composition, the layered silicate is preferably dispersed uniformly without local aggregation. The uniform dispersion referred herein means that the layered silicate is separated into flat plates in the polyamide, and 50% or more of the flat plates have an interlayer distance of 5 nm or more. The interlayer distance referred herein means the distance between barycenters of the flat plates. When the distance is larger, a better dispersed state is obtained, which results in improvement of the appearance, such as the transparency, and enhancement of the gas barrier property to oxygen, carbon dioxide and the like.

3-3. Gelation Preventing and Fish Eye Preventing Agent

In the polyamide composition containing the polyamide compound of the present invention, at least one kind of a carboxylate salt compound selected from sodium acetate, calcium acetate, magnesium acetate, calcium stearate, magnesium stearate, sodium stearate, and derivatives thereof is preferably added to the polyamide compound. Examples of the derivatives herein include a metal 12-hydroxystearate salt, such as calcium 12-hydroxystearate, magnesium 12-hydroxystearate and sodium 12-hydroxystearate. The addition of the carboxylate salt compound prevents gelation of the polyamide compound, which occur during the molding process, and suppresses fish eyes in a molded article thereby enhancing the moldability.

The amount of the carboxylate salt compound added is preferably from 400 to 10,000 ppm, more preferably from 800 to 5,000 ppm, and further preferably from 1,000 to 3,000 ppm, in terms of concentration in the polyamide composition. When the amount thereof is 400 ppm or more, the polyamide compound is suppressed from suffering thermal degradation, thereby preventing gelation. When the amount is 10,000 ppm or less, the polyamide composition may not cause molding failure and may not suffer coloration or whitening. When the carboxylate salt compound, which is a basic substance, is present in the molten polyamide compound, it is expected that the degradation of the polyamide compound caused by heat is delayed, and thereby formation of gel, which is a final denaturation product, is suppressed.

The carboxylate salt compounds mentioned above are excellent in handleability, and among these, a metal stearate salt is preferred since it is inexpensive, has a function of a lubricant, and stabilizes the molding process. The form of the carboxylate salt compound is not particularly limited. The compound in the form of powder with a smaller particle diameter is preferred for dry mixing since it can be uniformly dispersed in the polyamide composition, and the particle diameter thereof is preferably 0.2 mm or less.

3-4. Antioxidant

The polyamide composition containing the polyamide compound of the present invention preferably contains an antioxidant from the standpoint of controlling the oxygen absorbing capability and suppressing deterioration of the mechanical properties. Examples of the antioxidant include a copper antioxidant, a hindered phenol antioxidant, a hindered amine antioxidant, a phosphorus antioxidant and a thio antioxidant, and among these, a hindered phenol antioxidant and a phosphorus antioxidant are preferred.

Specific examples of the hindered phenol antioxidant include triethylene glycol bis[3-(3-t-butyl-5-methyl-4-hydroxyphenyl)propionate, 4,4'-butylidene bis(3-methyl-6-t-butylphenol), 1,6-hexanediol bis[3-(3,5-di-t-butyl-4-hydroxyphenyl)propionate, 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, 2,2-thiobis(4-methyl-6-1-butylphenol), N,N'-hexamethylene bis(3,5-di-t-butyl-4-hydroxy-hydroxycinnamide), 3,5-di-t-butyl-4-hydroxybenzylphosphonate diethyl ester, 1,3,5-trimethyl-2,4,6-tris(3,5-di-t-butyl-4-hydroxybenzyl)benzene, ethyl calcium bis(3,5-di-t-butyl-4-hydroxybenzylsulfonate, tris(3,5-di-t-butyl-4-hydroxybenzyl) isocyanurate, 2,6-di-t-butyl-p-cresol, butylated hydroxyanisole, 2,6-di-t-butyl-4-ethylphenol, stearyl β-(3,5-di-t-butyl-4-hydroxyphenyl)propionate, 2,2'-methylene bis(4-methyl-6-t-butylphenol), 2,2'-methylene bis(4-ethyl-6-t-butylphenol), 4,4'-thiobis(3-methyl-6-t-butylphenol), octylated diphenylamine, 2,4-bis[(octylthio)methyl]-O-cresol, isooctyl-3-(3,5-di-t-butyl-4-hydroxyphenyl)propionate, 4,4'-butylidene bis (3-methyl-6-t-butylphenol, 3,9-bis[1,1-dimethyl-2-[β-(3-t-butyl-4-hydroxy-5-methylphenyl)propionyloxy]ethyl]-2,4,8,10-tetraoxaspiro[5.5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis(4'-hydroxy-3'-t-butylphenyl)butyric acid] glycol ester, 1,3,5-tris(3',5'-di-t-butyl-4'-hydroxybenzyl)-sec-triazin-2,4,6-(1H, 3H,5H)trione and d-α-tocopherol. These compounds may be used solely or as a mixture thereof. Specific examples of the commercially available product of the hindered phenol compound include Irganox 1010 and Irganox 1098 (both trade names), produced by BASF AG.

Specific examples of the phosphorus antioxidant include organic phosphorus compounds, such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis(2,4-di-tert-butylphenyl)pentaerythritol diphosphite, tris(2,4-di-tert-butylphenyl)phosphite, distearyl pentaerythritol diphosphite, tetra(tridecyl-4,4'-isopropylidenediphenyl diphosphite and 2,2-methylene bis(4,6-di-tert-butylphenyl)octyl phosphite. These compounds may be used solely or as a mixture thereof.

The content of the antioxidant in the polyamide composition is not particularly limited in such a range that does not impair the capabilities of the composition, and is preferably from 0.001 to 3 parts by mass, and more preferably from 0.01 to 1 parts by mass, per 100 parts by mass of the polyamide compound of the present invention, from the standpoint of controlling the oxygen absorbing capability and suppressing deterioration of the mechanical properties.

3-5. Impact Resistance Improving Agent

To the polyamide composition containing the polyamide compound of the present invention, an impact resistance improving agent may be added for improving the impact resistance and the pinhole resistance and the flexibility of the film. Examples of the impact resistance improving agent added include polyolefin, a polyamide elastomer, a hydrogenated product of a styrene-butadiene copolymer resin, an ionomer, an ethylene-ethyl acrylate copolymer resin, a maleic anhydride-modified product of an ethylene-ethyl acrylate copolymer resin, an ethylene-methacrylic acid copolymer resin, nylon 6, 66, 12, nylon 12, a nylon 12 elastomer, an ethylene-propylene copolymer elastomer and a polyester elastomer. The amount of the impact resistance improving agent added is preferably from 1 to 10% by mass, further preferably from 1 to 5% by mass, and particularly preferably from 2 to 3% by mass. When the addition amount is too large, the transparency and the gas barrier property may be decreased. When the addition amount is too small, the impact resistance and the pinhole resistance and the flexibility of the film may not be largely improved.

4. Purposes of Polyamide Compound

The polyamide compound of the present invention may be applied to any purpose that requires an oxygen barrier property or an oxygen absorbing capability. For example, the polyamide compound of the present invention solely may be charged in a sachet or the like and used as an oxygen absorbent.

Representative examples of the applications of the polyamide compound of the present invention include a molded article, such as a packaging material and a packaging container, but are not limited thereto. The polyamide compound of the present invention may be used by processing into at least a part of a molded article. For example, the polyamide compound of the present invention may be used as at least a part of a packaging material in the form of film or sheet, and may be used as at least a part of a packaging container, such as a bottle, a tray, a cup, a tube, a flat bag and various pouches, e.g., a standing pouch. The layer formed of the polyamide compound or the polyamide composition of the present invention is not particularly limited, and is preferably 1 μm or more.

The production method of the molded article, such as a packaging material and a packaging container is not particularly limited, and an arbitrary method may be employed. For example, for molding a packaging material in the form of film or sheet and a packaging material in the form of tube, they may be produced by melting the polyamide compound or the polyamide composition by passing through a T-die, a circular die or the like, and extruding the molten material from an extruder attached to the device. The molded article in the form of film obtained by the aforementioned method may be stretched to prepare a stretched film. A packaging container in the form of bottle may be produced in such a manner that the molten polyamide compound or polyamide material is injected from an injection molding machine into a metal mold to produce a preform, which is then subjected to blow stretching under heating to a stretching temperature.

A container in the form of tray, cup or the like may be produced by a method of injecting the molten polyamide compound or polyamide material from an injection molding machine into a metal mold, or a method of molding the packaging material in the form or sheet by such a molding method as vacuum molding or pneumatic molding. The production method of the packaging material and the packaging container is not limited to the aforementioned methods, but they may be produced by various methods.

The packaging material and the packaging container produced with the polyamide compound of the present invention are suitable for packaging and storing various articles. For example, they may package and store various articles, for example, beverages, seasonings, grain crops, liquid and solid processed foods that are necessarily charged aseptically or sterilized by heating, chemical agents, liquid household materials, medical drugs, semiconductor integrated circuit devices, and electronic devices.

EXAMPLES

The present invention will be described in more detail with reference to examples below, but the present invention is not limited to the examples.

In the following examples, poly-m-xylylene adipamide is referred to as "N-MXD6", poly-m-xylylene sebacamide is referred to as "N-MXD10", poly-m-xylylene dodecanamide is referred to as "N-MXD12", isophthalic acid-copolymerized poly-m-xylylene adipamide is referred to as "N-MXD6I", isophthalic acid-copolymerized poly-m-xylylene sebacamide is referred to as "N-MXD10I", isophthalic acid-copolymerized poly-m-xylylene dodecanamide is referred to as "N-MXD12I", terephthalic acid-copolymerized poly-m-xylylene adipamide is referred to as "N-MXD6T", 2,6-naphthalenedicarboxylic acid-copolymerized poly-m-xylylene adipamide is referred to as "N-MXD6N", ε-caprolactam-copolymerized poly-m-xylylene adipamide is referred to as "N-MXD6,6", ε-caprolactam-copolymerized poly-m-xylylene sebacamide is referred to as "N-MXD10,6", ε-caprolactam-copolymerized poly-m-xylylene dodecanamide is referred to as "N-MXD12,6", and laurolactam-copolymerized poly-m-xylylene adipamide is referred to as "N-MXD6,12".

The polyamide compounds obtained in Examples and Comparative Examples were measured for the component composition, the relative viscosity, the number average molecular weight, the glass transition temperature and the melting point in the following manners. The measurements of the oxygen absorbing rate, the oxygen absorbing amount, the oxygen permeability coefficient and the haze, the sensory test, and the tensile test were performed in the following manners.

(1) Component Composition

The component composition of the copolymer was quantitatively determined with $^1$H-NMR (400 MHz, JNM-AL400, a trade name, produced by JEOL, Ltd., measurement mode: NON($^1$H)). Specifically, a 5% by mass solution of the polyamide compound was prepared with formic acid-d as a solvent, and subjected to the $^1$H-NMR measurement.

(2) Relative Viscosity 0.2 g of a pellet sample was precisely weighed and dissolved in 100 mL of 96% sulfuric acid at 20 to 30° C. under stirring. After completely dissolved, 5 mL of the solution was quickly placed in a Cannon-Fenske viscometer, which was then allowed to stand in a thermostat chamber at 25° C. for 10 minutes, and then the fall time (t) was measured. The fall time ($t_0$) of 96% sulfuric acid was measured in the same manner. The relative viscosity was calculated from t and $t_0$ according to the following expression.

$$\text{Relative viscosity} = t/t_0$$

(3) Number Average Molecular Weight (Mn)

The polyamide compound was precisely weighed and dissolved in a solution of phenol/ethanol=4/1 by volume at 20 to 30° C. under stirring. After completely dissolved, under stirring, the inner wall of the container was washed out with 5 mL of methanol, and the solution was subjected to neutralization titration with a 0.01 mol/L hydrochloric acid aqueous solution, thereby measuring the terminal amino group concentration [$NH_2$].

The polyamide compound was precisely weighed and dissolved in benzyl alcohol at 160 to 180° C. under stirring under a nitrogen stream. After completely dissolved, the solution was cooled to 80° C. or less under a nitrogen stream. Under stirring, the inner wall of the container was washed out with 10 mL of methanol, and the solution was subjected to neutralization titration with a 0.01 mol/L sodium hydroxide aqueous solution, thereby measuring the terminal carboxyl group concentration [COOH].

The number average molecular weight was obtained from the terminal amino group concentration [$NH_2$] and the terminal carboxyl group concentration [COOH] thus obtained, according to the following expression.

$$\text{Number average molecular weight} = 2/([NH_2]+[COOH])$$

wherein [$NH_2$] represents the terminal amino group concentration (eq/g), and [COOH] represents the terminal carboxyl group concentration (eq/g).

(4) Glass Transition Temperature and Melting Point

DSC measurement (differential scanning calorimeter measurement) was performed with a differential scanning calorimeter (DSC-60, a trade name, produced by Shimadzu Corporation) at a temperature increasing rate of 10° C./min under a nitrogen stream, thereby measuring the glass transition temperature (Tg) and the melting point (Tm).

For reference, the melting points of N-MXD6, N-MXD10 and N-MXD12 that were not added or copolymerized with another component were 237° C., 192° C. and 187° C., respectively. The melting point of N-MXD6I that was not added or copolymerized with another component was 229° C.

(5) Oxygen Absorbing Rate and Oxygen Absorbing Amount 2 g of a powder specimen, which was obtained by finely pulverizing pellets or powder of the polyimide compound with a pulverizer, was packed with chartula, and charged in a bag formed of an aluminum laminated film sealed on three edges thereof having a dimension of 25 cm×18 cm along with cotton impregnated with 10 mL of water, and the bag was sealed to make an air amount inside the bag of 400 mL. The humidity in the bag was 100% RH (relative humidity). After storing at 40° C. for 28 days, the oxygen concentration inside the bag was measured with an oxygen concentration meter (LC-700F, a trade name, produced by Toray Engineering Co., Ltd.), and the oxygen absorbing amount (cc/g) was calculated from the oxygen concentration. A larger value thereof is preferred since it means an excellent oxygen absorbing capability.

In Examples 101 to 113 and 116 to 121 and Comparative Examples 101 to 107, a test piece, which was obtained by cutting out from a film specimen having a thickness of approximately 100 μm into 400 $cm^2$, was placed in the bag, which was stored at 40° C. for 28 days, as similar to the above operation. Thereafter, the oxygen concentration inside the bag was measured with an oxygen concentration meter (LC-700F, a trade name, produced by Toray Engineering Co., Ltd.). The oxygen absorbing amount per 1 $m^2$ of the film specimen was calculated from the oxygen concentration, and the oxygen absorbing amount per one day was obtained in terms of oxygen absorbing rate (cc/($m^2 \cdot$day)). A larger value thereof is preferred since it means an excellent oxygen absorbing capability.

(6) Oxygen Permeability Coefficient

The oxygen permeability of a film having a thickness of 100 μm at 23° C. and 60% RH by using an oxygen permeability measuring apparatus (Model OX-TRAN 2/21SH, produced by Mocon, Inc.) according to ASTM D3985, and was converted to the oxygen permeability coefficient (cc·mm/($m^2 \cdot$day·atm)). A smaller value thereof is preferred since it means a small oxygen permeation amount.

The oxygen permeability coefficients of N-MXD6, N-MXD10 and N-MXD12 that were not added or copolymerized with another component were 0.08 cc·mm/($m^2 \cdot$day·atm), 1.6 cc·mm/($m^2 \cdot$day·atm) and 2.9 cc·mm/($m^2 \cdot$day·atm), respectively.

(7) Sensory Test Evaluation

A test piece, which was obtained by cutting out from a film specimen into 400 $cm^2$, or 2 g of a powder specimen, which was obtained by finely pulverizing pellets or powder of the polyamide compound with a pulverizer, was packed with chartula, and charged in a bag formed of an aluminum laminated film sealed on three edges thereof (an odorless grade sealant was used for sealing the innermost layer) having a dimension of 25 cm×18 cm along with cotton impregnated with 10 mL of water, and the bag was sealed to make an air amount inside the bag of 400 mL. The humidity in the bag was 100% RH. After storing at 40° C. for 28 days, the air inside the bag was taken out with a syringe and evaluated for odor by ten subjects. As the control, a bag containing no film specimen or powder specimen was prepared. The sensory test evaluation was performed according to the following standard, and an average value of the ten subjects was calculated. A smaller value thereof is preferred since it means a less amount of odor.

Evaluation Standard
0: no odor perceived (control)
1: slight difference from control perceived
2: difference from control perceived
3: significant difference from control perceived (8) Tensile Test A film specimen having a thickness of approximately 100 μm was stored in a thermostat chamber at 40° C. and 100% RH for 28 days for absorbing oxygen and then subjected to humidity conditioning at 23° C. and 50% RH for one week. The film specimen was cut into a dimension of 10 mm in width and 100 mm in length and subjected to a tensile test at a tensile rate of 50 mm/min with a tensile tester (Strograph V1-C, a trade name, produced by Toyo Seiki Seisaku-sho, Ltd.) for measuring the load at breakage of the film, and the tensile breaking strength was obtained according to the following expression.

Tensile breaking strength (MPa)=(load on breakage (N))/(cross sectional area of film specimen ($mm^2$))

The tensile breaking strength obtained by the test was used as an index of retention of the mechanical properties. For comparison, a film specimen that was not stored (not subjected to oxygen absorption) was subjected to humidity conditioning at 23° C. and 50% RH for one week, and then subjected to the same tensile test. A larger value thereof after oxygen absorption is preferred since it means less deterioration of the resin.

(9) Yellowness Index (YI)

The yellowness index of pellets of the polyamide compound was measured with a colormeter (Model ZE2000, produced by Nippon Denshoku Industries Co., Ltd.)

(10) Haze

A film specimen having a thickness of approximately 100 μm was measured with a haze value measuring apparatus (Model COH-300A, produced by Nippon Denshoku Industries Co., Ltd.) according to JIS K7105, and the measured value was converted to a haze per 100 μm. A smaller value thereof is preferred since it means less coloration.

Example 101

Melt Polymerization of Polyamide Compound by Atmospheric Dropping Method

In a reaction vessel having an inner capacity of 50 L, equipped with a stirrer, a partial condenser, a total condenser, a thermometer, a dropping funnel, a nitrogen introducing tube and a strand die, 13,000 g (88.96 mol) of precisely weighed adipic acid (produced by Asahi Kasei Chemicals Corporation), 880.56 g (9.88 mol) of DL-alanine (produced by Musashino Chemical Laboratory, Ltd.), 11.7 g (0.11 mol) of sodium hypophosphite and 6.06 g (0.074 mol) of sodium acetate were placed, and after sufficiently replacing with nitrogen, the system was heated to 170° C. under a small amount of a nitrogen stream under stirring. 12,075.4 g (88.66 mol) of m-xylylenediamine (produced by Mitsubishi Gas Chemical Co., Inc.) was added dropwise thereto under stirring, and the system was continuously heated while removing condensation water formed. After completing the dropwise addition of m-xylylenediamine, the reaction was continued at an inner temperature of 260° C. for 40 minutes. Thereafter, the system was pressurized with nitrogen, and the polymer was taken out from the strand die and pelletized, thereby providing approximately 23 kg of a polyamide compound.
(Solid Phase Polymerization of Polyamide Compound)

The polyamide compound was charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 200° C. over approximately 70 minutes, and then maintained at 200° C. for 30 minutes. Nitrogen gas having a purity of 99% by volume or more was introduced into the system, and the tumble dryer was cooled while rotating, thereby providing DL-alanine-copolymerized N-MXD6 (polyamide compound 101).

FIG. 1 shows a $^1$H-NMR chart of the polyamide compound 101. In FIG. 1, the absorption peak around 1.5 to 1.7 ppm is an absorption peak a1 derived from hydrogen of the methylene group that is not adjacent to the carbonyl group of adipic acid, and an absorption peak b1 derived from hydrogen of the methyl group of DL-alanine, and the absorption peaks a1 and b1 appear overlapping. FIG. 1 shows the integrated intensity of the absorption peak a1 and the absorption peak b1 added. The absorption peak around 2.5 ppm is an absorption peak c1 derived from hydrogen of the methylene group that is adjacent to the carbonyl group of adipic acid. The absorption peak around 7.0 to 7.47 ppm is an absorption peak d1 derived from hydrogen of the aromatic ring of m-xylylenediamine (MXDA).

The amount of the DL-alanine unit in the polyamide compound is calculated from the integrated intensities of the peaks according to the following expression.

Amount of DL-alanine unit in polyamide compound (% by mol) =
$$\frac{(a1+b1-c1)/3}{[(a1+b1-c1)/3]+(c1/4)+(d1/4)} \times 100$$

According to the calculation, it was identified that the polyamide compound 101 contained the DL-alanine unit in an amount of approximately 5.3% by mol (5.8% by mol on calculation). Accordingly, it was identified that the polyamide compound 101 had a ratio MKDA unit/adipic acid unit/DL-alanine unit=47.3/47.4/5.3 (% by mol).

In Examples and Comparative Examples below, the identification of the component compositions of the polyamide compounds thus produced was performed in the same manner.

(Production of Non-stretched Film of Polyamide Compound)

Pellets of the polyamide compound 101 were formed into a film with a single screw extruder having a diameter of 25 mm at an extrusion temperature of 260° C., a screw rotation number of 60 rpm and a withdrawing rate of 1.2 m/min, thereby producing a non-stretched film having a width of 200 mm and a thickness of from 95 to 105 μm.

Example 102

D-alanine-copolymerized N-MXD6 (polyamide compound 102) and a non-stretched film thereof were produced in the same manner as in Example 101 except that the α-amino acid was changed to D-alanine (produced by Musashino Chemical Laboratory, Ltd.).

Example 103

D-alanine-copolymerized N-MXD6 (polyamide compound 103) and a non-stretched film thereof were produced in the same manner as in Example 101 except that the α-amino acid was changed to L-alanine (produced by Sinogel Amino Acid Co., Ltd.).

Example 104

DL-2-aminobutyric acid-copolymerized N-MXD6 (polyamide compound 104) and a non-stretched film thereof were produced in the same manner as in Example 101 except that the α-amino acid was changed to DL-2-aminobutyric acid (produced by Japan Finechem Co., Inc. purified product), and the addition amount thereof was changed to make a content thereof in the polyamide compound of 2.6% by mol.

Example 105

DL-2-aminobutyric acid-copolymerized N-MXD6 (polyamide compound 105) and a non-stretched film thereof were produced in the same manner as in Example 104 except that the addition amount of DL-2-aminobutyric acid was changed to make a content thereof in the polyamide compound of 5.3% by mol.

Example 106

DL-2-aminobutyric acid-copolymerized N-MXD6 (polyamide compound 106) and a non-stretched film thereof were produced in the same manner as in Example 104 except that the addition amount of DL-2-aminobutyric acid was changed to make a content thereof in the polyamide compound of 11.1% by mol.

Example 107

DL-2-aminobutyric acid-copolymerized N-MXD6 (polyamide compound 107) and a non-stretched film thereof were produced in the same manner as in Example 104 except that the addition amount of DL-2-aminobutyric acid was changed to make a content thereof in the polyamide compound of 25.0% by mol.

Example 108

DL-valine-copolymerized N-MXD6 (polyamide compound 108) and a non-stretched film thereof were produced in the same manner as in Example 104 except that the α-amino acid was changed to DL-valine (produced by Sinogel Amino Acid Co., Ltd.).

Example 109

DL-leucine-copolymerized N-MXD6 (polyamide compound 109) and a non-stretched film thereof were produced in the same manner as in Example 104 except that the α-amino acid was changed to DL-leucine (produced by Ningbo Haishuo Bio-technology Co., Ltd.).

Example 110

DL-tert-leucine-copolymerized N-MXD6 (polyamide compound 110) and a non-stretched film thereof were produced in the same manner as in Example 104 except that the α-amino acid was changed to DL-tert-leucine (produced by Japan Finechem Co., Inc. purified product).

Example 111

DL-phenylalanine-copolymerized N-MXCD6 (polyamide compound 111) and a non-stretched film thereof were produced in the same manner as in Example 104 except that the α-amino acid was changed to DL-phenylalanine (produced by Sinogel Amino Acid Co., Ltd.).

Example 112

DL-alanine-copolymerized N-MXD10 (polyamide compound 112) and a non-stretched film thereof were produced in the same manner as in Example 101 except that adipic acid was changed to sebacic acid (produced by Itoh Oil Chemicals Co., Ltd.), and the addition amount of DL-alanine was changed to make a content thereof in the polyamide compound of 2.6% by mol.

Example 113

DL-alanine-copolymerized N-MXD12 (polyamide compound 113) and a non-stretched film thereof were produced in the same manner as in Example 112 except that adipic acid was changed to dodecanedioic acid (produced by Ube Industries, Ltd.).

Example 114

DL-alanine-copolymerized N-MXD6 (polyamide compound 114) was produced in the same manner as in Example 101 except that the solid phase polymerization was not performed. The molecular weight thereof was not sufficiently increased on polymerization, and thus the measurement of oxygen permeability coefficient and haze and the tensile test for a non-stretched film were not performed.

Example 115

DL-alanine-copolymerized N-MXD6 (polyamide compound 115) was produced in the same manner as in Example 101 except that on the melt polymerization the final temperature after completing the dropwise addition of m-xylylenediamine was changed to 230° C., and the solid phase polymerization was not performed. The molecular weight thereof was not sufficiently increased on polymerization, and thus the measurement of oxygen permeability coefficient and haze and the tensile test for a non-stretched film were not performed.

Example 116

DL-alanine-copolymerized N-MXD6 (polyamide compound 116) and a non-stretched film thereof were produced in the same manner as in Example 101 except that the retention time after increasing the temperature to 200° C. in the solid phase polymerization was changed to 150 minutes.

Example 117

DL-alanine-copolymerized N-MXD6 (polyamide compound 117) and a non-stretched film thereof were produced in the same manner as in Example 101 except that on the melt polymerization the final temperature after completing the dropwise addition of m-xylylenediamine was changed to 240° C., and the temperature on the solid phase polymerization was changed to 180° C.

Example 118

Melt Polymerization of Polyamide Compound by Pressurized Salt Method

In a reaction vessel having an inner capacity of 50 L, equipped with a stirrer, a partial condenser, a total condenser, a thermometer, a dropping funnel, a nitrogen introducing tube and a strand die, 13,000 g (88.96 mol) of precisely weighed adipic acid (produced by Asahi Kasei Chemicals Corporation), 880.56 g (9.88 mol) of DL-alanine (produced by Musashino Chemical Laboratory, Ltd.), 12,075.4 g (88.66 mol) of m-xylylenediamine (produced by Mitsubishi Gas Chemical Co., Inc.), 10,000 g of distilled water, 11.7 g (0.11 mol) of sodium hypophosphite and 6.06 g (0.074 mol) of sodium acetate were placed, and after sufficiently replacing with nitrogen, a nylon salt was prepared under an increased pressure of 0.2 MPa. Thereafter, the temperature of the system was increased under stirring, and at the time when the inner pressure reached 1.0 MPa, the pressure of 1.0 MPa was maintained, and the system was heated to 190° C., while withdrawing water. After discharging water in an amount of 90% of the theoretical amount, the reaction was continued at an inner temperature of 230° C. for 30 minutes. Thereafter, the system was depressurized to 600 mmHg, and after confirming sufficient increase of the torque, the system was pressurized with nitrogen, and the polymer was taken out from the strand die and pelletized, thereby providing approximately 23 kg of a polyamide compound.

(Solid Phase Polymerization of Polyamide Compound)

The polyamide compound was charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 180° C. over approximately 60 minutes, and then maintained at 180° C. for 60 minutes. Nitrogen gas having a purity of 99% by volume or more was introduced into the system, and the tumble dryer was cooled while rotating, thereby providing DL-alanine-copolymerized N-MXD6 (polyamide compound 118).

Example 119

DL-alanine-copolymerized N-MXD6 (polyamide compound 119) and a non-stretched film thereof were produced in the same manner as in Example 118 except that the addition amount of DL-alanine was changed to make a content thereof in the polyamide compound of 11.1% by mol.

Example 120

Melt Polymerization of Polyamide Compound by Pressurized Dropping Method

In a reaction vessel having an inner capacity of 50 L, equipped with a stirrer, a partial condenser, a total condenser, a thermometer, a dropping funnel, a nitrogen introducing tube and a strand die, 13,000 g (88.96 mol) of precisely weighed adipic acid (produced by Asahi Kasei Chemicals Corporation), 880.56 g (9.88 mol) of DL-alanine (produced by Musashino Chemical Laboratory, Ltd.), 11.7 g (0.11 mol) of sodium hypophosphite and 6.06 g (0.074 mol) of sodium acetate were placed, and after sufficiently replacing with nitrogen, the system was melted by heating to 170° C. under increased pressure of 0.2 MPa under stirring. Thereafter, after adding 12,075.4 g (88.66 mol) of m-xylylenediamine (produced by Mitsubishi Gas Chemical Co., Inc.) dropwise thereto, the system was heated under stirring, and at a the time when the inner pressure reached 0.4 MPa, the pressure of 0.4 MPa was maintained, the system was heated to 230° C., and the reaction was continued for 30 minutes while withdrawing water. Thereafter, the system was depressurized to 600 mmHg, and after confirming sufficient increase of the torque, the system was pressurized with nitrogen, and the polymer was taken out from the strand die and pelletized, thereby providing approximately 23 kg of a polyamide compound.
(Solid Phase Polymerization of Polyamide Compound)

The polyamide compound was charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 180° C. over approximately 60 minutes, and then maintained at 180° C. for 60 minutes. Nitrogen gas having a purity of 99% by volume or more was introduced into the system, and the tumble dryer was cooled while rotating, thereby providing DL-alanine-copolymerized N-MXD6 (polyamide compound 120).

Example 121

DL-alanine-copolymerized N-MXD6 (polyamide compound 121) and a non-stretched film thereof were produced in the same manner as in Example 120 except that the addition amount of DL-alanine was changed to make a content thereof in the polyamide compound of 11.1% by mol.

Comparative Example 101

Glycine-copolymerized N-MXD6 (polyamide compound 122) and a non-stretched film thereof were produced in the same manner as in Example 104 except that the α-amino acid was changed to glycine (produced by Tokyo Chemical Industry Co., Ltd.) having secondary hydrogen on the α-position.

Comparative Example 102

2-Aminoisobutylic acid-copolymerized N-MXD6 (polyamide compound 123) and a non-stretched film thereof were produced in the same manner as in Example 104 except that the α-amino acid was changed to 2-aminoisobutylic acid (2-amino-2-methylpropanoic acid, produced by Japan Finechem Co., Inc., purified product) having no hydrogen on the α-position.

Comparative Example 103

To N-MXD6 (S6007, a trade name, produced by Mitsubishi Gas Chemical Co., Inc.), which was polyamide formed of m-xylylenediamine and adipic acid, cobalt stearate was added to make a cobalt content in the resin composition of 400 ppm, and dry-mixed. The resulting mixture was formed into a film with a twin screw extruder having a diameter of 30 mm at an extrusion temperature of 260° C., a screw rotation number of 60 rpm, a feed screw rotation number of 12 rpm and a withdrawing rate of 1.8 m/min, thereby producing a non-stretched film having a width of 300 mm and a thickness of from 95 to 105 μm.

Comparative Example 104

To 100 parts by mass of N-MXD6 (S6007, a trade name, produced by Mitsubishi Gas Chemical Co., Inc.), which was polyamide formed of m-xylylenediamine and adipic acid, 5 parts by mass of maleic acid-modified polybutadiene (PB) (M-2000-20, a trade name, produced by Nippon Petrochemicals Co., Ltd.) and cobalt stearate in an amount that made a cobalt content in the resin composition of 400 ppm were added, and dry-mixed. The resulting mixture was formed into a film with a twin screw extruder having a diameter of 30 mm at an extrusion temperature of 260° C., a screw rotation number of 60 rpm, a feed screw rotation number of 14 rpm and a withdrawing rate of 2.0 m/min, thereby producing a non-stretched film having a width of 300 mm and a thickness of from 95 to 105 μm.

Comparative Example 105

Melt Polymerization of Polyamide Compound by Atmospheric Dropping Method

In a reaction vessel having an inner capacity of 50 L, equipped with a stirrer, a partial condenser, a total condenser, a thermometer, a dropping funnel, a nitrogen introducing tube and a strand die, 14,615 g (100 mol) of precisely weighed adipic acid (produced by Asahi Kasei Chemicals Corporation), 12.7 g (0.120 mol) of sodium hypophosphite and 6.60 g (0.0805 mol) of sodium acetate were placed, and after sufficiently replacing with nitrogen, the system was heated to 170° C. under a small amount of a nitrogen stream under stirring. 13,539.2 g (99.4 mol) of m-xylylenediamine (produced by Mitsubishi Gas Chemical Co., Inc.) was added dropwise thereto under stirring, and the system was continuously heated while removing condensation water formed. After completing the dropwise addition of m-xylylenediamine, the reaction was continued at an inner temperature of 260° C. for 40 minutes. Thereafter, the system was pressurized with nitrogen, and the polymer was taken out from the strand die and pelletized, thereby providing approximately 25 kg of a polyamide compound.
(Solid Phase Polymerization of Polyamide Compound)

The polyamide compound was charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 200° C. over approximately 70 minutes, and then maintained at 200° C. for 30 minutes. Nitrogen gas having a purity of 99% by volume or more was introduced into the system, and the tumble dryer was cooled while rotating, thereby providing N-MXD6 (polyamide compound 124).

(Production of Non-Stretched Film of Polyamide Compound)

To 100 parts by mass of the polyamide compound 124, 5 parts by mass of DL-alanine (produced by Musashino Chemical Laboratory, Ltd.) was added and dry-mixed. The resulting mixture, which was prevented from being copolymerized, was formed into a film with a small-sized single screw extruder having a diameter of 15 mm at an extrusion temperature of 260° C., a screw rotation number of 30 rpm, a feed screw rotation number of 14 rpm and a withdrawing rate of 1.0 m/min, thereby producing a non-stretched film having a width of 110 mm and a thickness of from 95 to 105 p.m.

Comparative Example 106

Melt Polymerization of Polyamide Compound by Atmospheric Dropping Method

In a reaction vessel having an inner capacity of 50 L, equipped with a stirrer, a partial condenser, a total condenser, a thermometer, a dropping funnel, a nitrogen introducing tube and a strand die, 17,000 g (84.1 mol) of precisely weighed sebacic acid (produced by Itoh Oil Chemicals Co., Ltd.), 13.1 g (0.124 mol) of sodium hypophosphite and 6.81 g (0.0830 mol) of sodium acetate were placed, and after sufficiently replacing with nitrogen, the system was heated to 170° C. under a small amount of a nitrogen stream under stirring. 11,391.0 g (83.6 mol) of m-xylylenediamine (produced by Mitsubishi Gas Chemical Co., Inc.) was added dropwise thereto under stirring, and the system was continuously heated while removing condensation water formed. After completing the dropwise addition of m-xylylenediamine, the reaction was continued at an inner temperature of 260° C. for 40 minutes. Thereafter, the system was pressurized with nitrogen, and the polymer was taken out from the strand die and pelletized, thereby providing approximately 25 kg of a polyamide compound.

(Solid Phase Polymerization of Polyamide Compound)

The polyamide compound was charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 170° C. over approximately 15 minutes, and then maintained at 170° C. for 240 minutes. Nitrogen gas having a purity of 99% by volume or more was introduced into the system, and the tumble dryer was cooled while rotating, thereby providing N-MXD10 (polyamide compound 125).

(Production of Non-Stretched Film of Polyamide Compound)

To 100 parts by mass of the polyamide compound 125, 5 parts by mass of DL-alanine (produced by Musashino Chemical Laboratory, Ltd.) was added and dry-mixed. The resulting mixture, which was prevented from being copolymerized, was formed into a film with a small-sized single screw extruder having a diameter of 15 mm at an extrusion temperature of 240° C., a screw rotation number of 30 rpm, a feed screw rotation number of 14 rpm and a withdrawing rate of 1.0 m/min, thereby producing a non-stretched film having a width of 110 mm and a thickness of from 95 to 105 µm.

Comparative Example 107

Melt Polymerization of Polyamide Compound by Atmospheric Dropping Method

In a reaction vessel having an inner capacity of 50 L, equipped with a stirrer, a partial condenser, a total condenser, a thermometer, a dropping funnel, a nitrogen introducing tube and a strand die, 17,500 g (76.0 mol) of precisely weighed dodecanedioic acid (produced by Ube Industries, Ltd.), 12.9 g (0.122 mol) of sodium hypophosphite and 6.73 g (0.0820 mol) of sodium acetate were placed, and after sufficiently replacing with nitrogen, the system was heated to 170° C. under a small amount of a nitrogen stream under stirring. 10,302.3 g (75.6 mol) of m-xylylenediamine (produced by Mitsubishi Gas Chemical Co., Inc.) was added dropwise thereto under stirring, and the system was continuously heated while removing condensation water formed. After completing the dropwise addition of m-xylylenediamine, the reaction was continued at an inner temperature of 260° C. for 40 minutes. Thereafter, the system was pressurized with nitrogen, and the polymer was taken out from the strand die and pelletized, thereby providing approximately 24 kg of a polyamide compound.

(Solid Phase Polymerization of Polyamide Compound)

The polyamide compound was charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 160° C. over approximately 10 minutes, and then maintained at 160° C. for 420 minutes. Nitrogen gas having a purity of 99% by volume or more was introduced into the system, and the tumble dryer was cooled while rotating, thereby providing N-MXD12 (polyamide compound 126).

(Production of Non-Stretched Film of Polyamide Compound)

To 100 parts by mass of the polyamide compound 126, 5 parts by mass of DL-alanine (produced by Musashino Chemical Laboratory, Ltd.) was added and dry-mixed. The resulting mixture, which was prevented from being copolymerized, was formed into a film with a small-sized single screw extruder having a diameter of 15 mm at an extrusion temperature of 230° C., a screw rotation number of 30 rpm, a feed screw rotation number of 12 rpm and a withdrawing rate of 1.0 m/min, thereby producing a non-stretched film having a width of 110 mm and a thickness of from 95 to 105 µm.

TABLE 1

| | Polyamide | Amino acid content (% by mol) | Relative viscosity | Tg (° C.) | Tm (° C.) | Yl | Oxygen absorbing amount (cc/g) 40° C., 28 days | Oxygen absorbing rate (cc/(m² · day)) 40° C., 28 days | Oxygen permeability coefficient of film** | Sensory test evaluation | Tensile breaking strength (MPa) Before oxygen absorption | Tensile breaking strength (MPa) After oxygen absorption | Haze |
|---|---|---|---|---|---|---|---|---|---|---|---|---|---|
| Example 101 | DL-alanine-copolymerized N-MXD6 | 5.3 | 2.6 | 86 | 225 | 16 | 26 | 110 | 0.001 | 1 | 74 | 70 | 1.9 |
| Example 102 | D-alanine-copolymerized N-MXD6 | 5.3 | 2.6 | 86 | 225 | 16 | 25 | 109 | 0.001 | 1 | 75 | 70 | 2.0 |
| Example 103 | L-alanine-copolymerized N-MXD6 | 5.3 | 2.6 | 86 | 225 | 18 | 25 | 112 | 0.001 | 1 | 74 | 69 | 2.0 |
| Example 104 | DL-AABA*1-copolymerized N-MXD6 | 2.6 | 2.6 | 86 | 231 | 13 | 14 | 45 | 0.005 | 1 | 80 | 75 | 2.2 |
| Example 105 | DL-AABA*1-copolymerized N-MXD6 | 5.3 | 2.6 | 85 | 224 | 16 | 26 | 70 | 0.001 | 1 | 76 | 70 | 2.4 |
| Example 106 | DL-AABA*1-copolymerized N-MXD6 | 11.1 | 2.2 | 84 | 207 | 18 | 30 | 82 | 0.001 | 1 | 74 | 64 | 2.6 |
| Example 107 | DL-AABA*1-copolymerized N-MXD6 | 25 | 2.0 | 82 | N.D. | 23 | 35 | 101 | 0.001 | 1 | 65 | 60 | 2.7 |
| Example 108 | DL-valine-copolymerized N-MXD6 | 2.6 | 2.6 | 86 | 231 | 13 | 14 | 94 | 0.001 | 1 | 75 | 70 | 2.0 |
| Example 109 | DL-leucine-copolymerized N-MXD6 | 2.6 | 2.6 | 86 | 231 | 13 | 15 | 86 | 0.001 | 1 | 76 | 71 | 2.0 |
| Example 110 | DL-t-leucine-copolymerized N-MXD6 | 2.6 | 2.6 | 86 | 231 | 13 | 15 | 68 | 0.001 | 1 | 77 | 72 | 1.9 |
| Example 111 | DL-Phe*2-copolymerized N-MXD6 | 2.6 | 2.6 | 86 | 231 | 19 | 12 | 90 | 0.001 | 1 | 79 | 73 | 2.0 |
| Example 112 | DL-alanine-copolymerized N-MXD10 | 2.6 | 2.6 | 61 | 186 | 13 | 13 | 34 | 0.2 | 1 | 37 | 32 | 2.0 |
| Example 113 | DL-alanine-copolymerized N-MXD12 | 2.6 | 2.6 | 57 | 184 | 11 | 10 | 26 | 0.7 | 1 | 30 | 25 | 2.0 |
| Example 114 | DL-alanine-copolymerized N-MXD6 | 5.3 | 1.7 | 86 | 225 | 16 | 23 | — | — | 1 | — | — | — |
| Example 115 | DL-alanine-copolymerized N-MXD6 | 5.3 | 1.3 | 86 | 225 | 9 | 23 | — | — | 1 | — | — | — |
| Example 116 | DL-alanine-copolymerized N-MXD6 | 5.3 | 3.4 | 86 | 225 | 20 | 27 | 105 | 0.001 | 1 | 83 | 79 | 1.8 |
| Example 117 | DL-alanine-copolymerized N-MXD6 | 5.3 | 2.5 | 86 | 225 | 8 | 25 | 110 | 0.001 | 1 | 88 | 77 | 1.9 |
| Example 118 | DL-alanine-copolymerized N-MXD6 | 5.3 | 2.6 | 86 | 225 | 6 | 27 | 97 | 0.001 | 1 | 75 | 69 | 2.0 |
| Example 119 | DL-alanine-copolymerized N-MXD6 | 11.1 | 2.3 | 85 | 207 | 9 | 27 | 118 | 0.001 | 1 | 77 | 68 | 1.7 |
| Example 120 | DL-alanine-copolymerized N-MXD6 | 5.3 | 2.6 | 86 | 225 | 3 | 28 | 98 | 0.001 | 1 | 74 | 67 | 1.8 |
| Example 121 | DL-alanine-copolymerized N-MXD6 | 11.1 | 2.3 | 86 | 207 | 8 | 28 | 120 | 0.001 | 1 | 76 | 68 | 1.8 |
| Comparative Example 101 | Glycine-copolymerized N-MXD6 | 2.6 | 2.6 | 86 | 231 | 11 | 1 | 5 | 0.08 | 1 | 82 | 80 | 1.8 |
| Comparative Example 102 | AIB*3-copolymerized N-MXD6 | 2.6 | 2.6 | 86 | 231 | 12 | 0 | 0 | 0.08 | 1 | 79 | 76 | 2.0 |

TABLE 1-continued

| | Polyamide | Amino acid content (% by mol) | Relative viscosity | Tg (°C.) | Tm (°C.) | YI | Oxygen absorbing amount (cc/g) 40° C., 28 days | Oxygen absorbing rate (cc/(m² · day)) 40° C., 28 days | Oxygen permeability coefficient of film** | Sensory test evaluation | Tensile breaking strength (MPa) Before oxygen absorption | Tensile breaking strength (MPa) After oxygen absorption | Haze |
|---|---|---|---|---|---|---|---|---|---|---|---|---|---|
| Comparative Example 103 | N-MXD6 (Co mixed)*⁴ | 0 | 2.6 | 87 | 237 | −1 | 20 | 38 | 0.001 | 2 | 83 | 0 | 1.9 |
| Comparative Example 104 | N-MXD6 (Co + PB mixed)*⁵ | 0 | 2.6 | 87 | 237 | 5 | 42 | 77 | 0.001 | 3 | 78 | 18 | 2.5 |
| Comparative Example 105 | N-MXD6 (DL-alanine mixed)*⁶ | 0 | 2.6 | 87 | 237 | 24 | 1 | 0 | 0.09 | 1 | 83 | 83 | 1.9 |
| Comparative Example 106 | N-MXD10 (DL-alanine mixed)*⁶ | 0 | 2.6 | 51 | 192 | 21 | 0 | 0 | 1.6 | 1 | 39 | 39 | 2.0 |
| Comparative Example 107 | N-MXD10 (DL-alanine mixed)*⁶ | 0 | 2.6 | 54 | 187 | 20 | 0 | 0 | 2.9 | 1 | 32 | 32 | 1.9 |

**unit of oxygen permeability coefficient cc · mm/(m² · day · atm)
*¹DL-AABA: DL-2-aminobutyric acid
*²DL-Phe: DL-phenylalanine
*³AIB: 2-aminoisobutyric acid
*⁴400 ppm of Co mixed
*⁵400 ppm of Co and 5 parts by mass of maleic acid-modified polybutadiene mixed
*⁶5 parts by mass of DL-alanine mixed
N.D.: not detected When a polyamide compound formed of repeating units of a single lactam or an α,ω-aminocarboxylic acid monomer or a polyamide compound formed of repeating units of a diamine and a dicarboxylic acid is copolymerized with another monomer component, there are generally observed decrease of the melting point and change of the glass transition temperature. In Examples 101 to 121 and Comparative Examples 101 and 102, a single melting peak is observed, and the melting point is decreased. Thus, it is found that the α-amino acid is copolymerized. In Comparative Examples 103 to 107, on the other hand, the melting point is not decreased, and thus it is found that no other component is copolymerized.

The polyamide compound that is copolymerized with an α-amino acid having no tertiary hydrogen is insufficient in oxygen absorbing capability (Comparative Examples 101 and 102). The ordinary polyamide composition having a cobalt compound mixed therein exhibits an oxygen absorbing capability and a good oxygen permeability coefficient, but has bluish color due to the addition of the cobalt compound although it has good transparency, and causes a large amount of odor especially in one using polybutadiene. Furthermore, the film after oxygen absorption is deteriorated to fail to maintain the shape thereof, and thus is not necessarily favorable in the purpose of packaging containers (Comparative Examples 103 and 104). The polyamide composition that is only mixed with an α-amino acid having tertiary hydrogen, but is not copolymerized therewith exhibits no oxygen absorbing capability (Comparative Examples 105 to 107).

On the other hand, the polyamide compound that is copolymerized with an α-amino acid having tertiary hydrogen exhibits a sufficient oxygen absorbing capability without a metal contained, and generates no offensive odor (Examples 101 to 121). In the case of the film specimen, in particular, the film has a good oxygen permeability coefficient, has good transparency, and maintains the mechanical properties after oxygen absorption (Examples 101 to 113 and 116 to 121).

It is found from the comparison among Examples 101 to 103 that the optical isomers of the α-amino acid do not affect the oxygen absorbing capability. It is found from the comparison among Examples 104 to 107 that the increase of the copolymerization ratio of the α-amino acid enhances the oxygen absorbing capability. Furthermore, it is found from the comparison among Examples 101 and 114 to 116 that the relative viscosity does not affect the oxygen absorbing capability. Moreover, it is found that the YI can be decreased in Examples 115 and 117, in which the melt polymerization temperature is decreased as compared to Examples 101 to 114. It is found that the YI can be decreased also in Examples 118 and 119 where the polyamide compound is polymerized by a pressurized salt method and in Examples 120 and 121 where the polyamide compound is polymerized by a pressurized dropping method.

Examples 122 to 131

Biaxially Stretched Film

Non-stretched films having a thickness of approximately 250 μm were obtained in the same manner as in Example 101 by using pellets of the polyamide compounds 101, 104 to 107, and 117 to 121 obtained in Examples 101, 104 to 107, and 117 to 121. The films were each stretched in MD 4 times and in TD 4 times at a stretching temperature of 130° C. with a biaxial stretching machine (tenter method), produced by Toyo Seiki Seisaku-sho, Ltd., and heat-set at 200° C. for 30 seconds, thereby providing a biaxially stretched film having a thickness of approximately 15 μm. The number of times of breakage on continuous production of 20 sheets of the biaxially stretched film was designated as an index of moldability. The biaxially stretched film was also measured for the initial oxygen permeability coefficient, the period of time where the initial oxygen permeability coefficient was completely maintained, and the haze of the film. The results are shown in Table 2.

nitrogen stream under stirring. 12,710 g (93.3 mol) of m-xylylenediamine (MXDA, produced by Mitsubishi Gas Chemical Co., Inc.) was added dropwise thereto under stirring, and the system was continuously heated while removing condensation water formed. After completing the dropwise addition of m-xylylenediamine, the reaction was continued at an inner temperature of 260° C. for 40 minutes. Thereafter, the system

TABLE 2

|  | Polyamide | Content of amino acid (% by mol) | Polymerization method (polymerization temperature) | Number of time of breakage on production 20 sheets of biaxially stretched films | Initial oxygen permeability coefficient of film** | Period of maintaining initial oxygen permeability coefficient (day) | Haze |
|---|---|---|---|---|---|---|---|
| Example 122 | DL-alanine-copolymerized N-MXD6 | 5.3 | atmospheric dropping method (260° C.) | 5 | 0.05 | 26 | 1.5 |
| Example 123 | AIB*³-copolymerized N-MXD6 | 2.6 | atmospheric dropping method (260° C.) | 3 | 0.08 | 15 | 1.7 |
| Example 124 | AIB*³-copolymerized N-MXD6 | 5.3 | atmospheric dropping method (260° C.) | 4 | 0.05 | 24 | 1.8 |
| Example 125 | AIB*³-copolymerized N-MXD6 | 11.1 | atmospheric dropping method (260° C.) | 4 | 0.05 | 56 | 1.4 |
| Example 126 | AIB*³-copolymerized N-MXD6 | 25 | atmospheric dropping method (260° C.) | 6 | 0.03 | 67 | 1.4 |
| Example 127 | DL-alanine-copolymerized N-MXD6 | 5.3 | atmospheric dropping method (230° C.) | 3 | 0.05 | 26 | 1.5 |
| Example 128 | DL-alanine-copolymerized N-MXD6 | 5.3 | pressurized salt method (230° C.) | 1 | 0.05 | 26 | 1.4 |
| Example 129 | DL-alanine-copolymerized N-MXD6 | 11.1 | pressurized salt method (230° C.) | 1 | 0.05 | 54 | 1.3 |
| Example 130 | DL-alanine-copolymerized N-MXD6 | 5.3 | pressurized dropping method (230° C.) | 0 | 0.05 | 26 | 1.3 |
| Example 131 | DL-alanine-copolymerized N-MXD6 | 11.1 | pressurized dropping method (230° C.) | 1 | 0.05 | 56 | 1.4 |

**unit of oxygen permeability coefficient cc · mm/(m² · day · atm)
*³AIB: 2-aminoisobutyric acid It is found from Table 2 that in Examples 128 and 129 where polymerization is performed by a pressurized salt method and Examples 130 and 131 where polymerization is performed by a pressurized dropping method, fish eyes and gelation, which may cause breakage of films upon biaxial stretching, are less formed, thereby providing products with stable properties.

Example 201

Melt Polymerization of Polyamide Compound by Atmospheric Dropping Method

In a reaction vessel having an inner capacity of 50 L, equipped with a stirrer, a partial condenser, a total condenser, a thermometer, a dropping funnel, a nitrogen introducing tube and a strand die, 13,000 g (88.9 mol) of precisely weighed adipic acid (produced by Asahi Kasei Chemicals Corporation), 777.8 g (4.7 mol) of high purity isophthalic acid (A.G. International Chemical Co., Inc.), 1,472.1 g (16.52 mol) of DL-alanine (produced by Musashino Chemical Laboratory, Ltd.) as an α-amino acid, 12.57 g (0.119 mol) of sodium hypophosphite and 6.52 g (0.0795 mol) of sodium acetate were placed, and after sufficiently replacing with nitrogen, the system was heated to 170° C. under a small amount of a was pressurized with nitrogen, and the polymer was taken out from the strand die and pelletized, thereby providing approximately 24.3 kg of a polyamide compound.

(Solid Phase Polymerization of Polyamide Compound)

The polyamide compound was charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 200° C. over approximately 70 minutes, and then maintained at 200° C. for 30 minutes. Nitrogen gas having a purity of 99% by volume or more was introduced into the system, and the tumble dryer was cooled while rotating, thereby providing DL-alanine-copolymerized N-MXD6I (polyamide compound 201).

Figure 2:
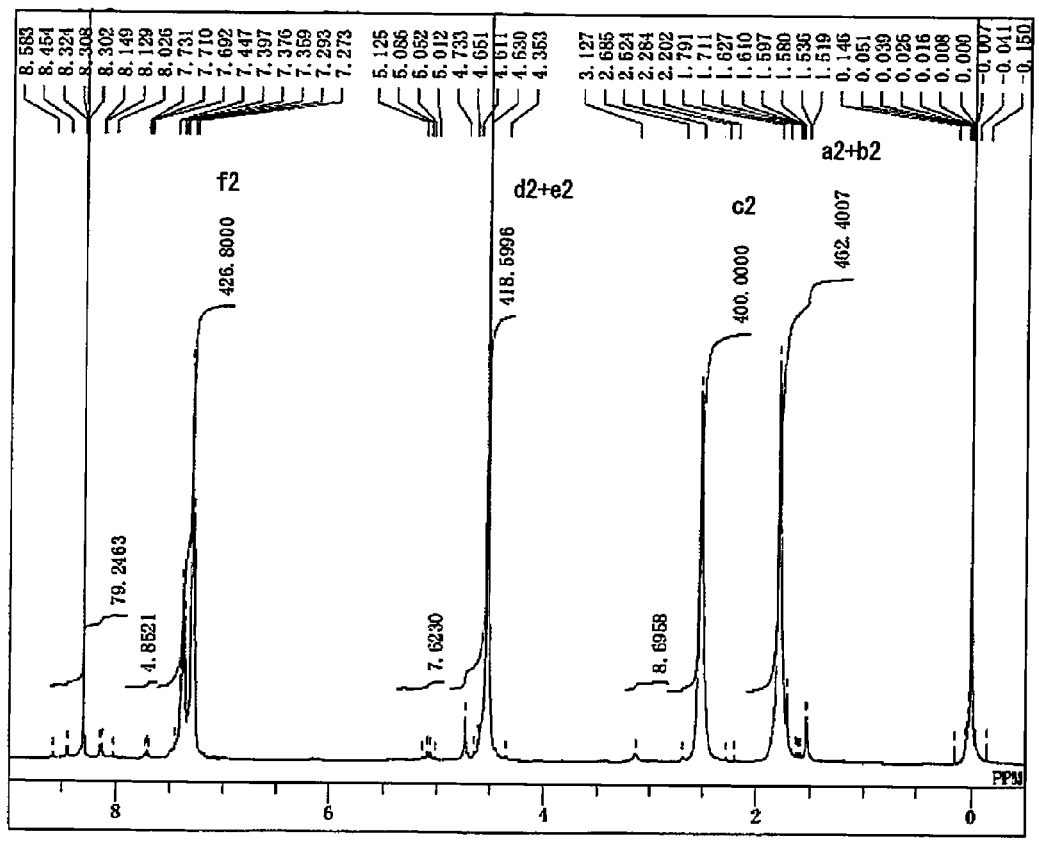
FIG. 2 is a $^1$H-NMR chart of the polyamide compound 201 produced in Example 201.

FIG. 2 shows a ¹H-NMR chart of the polyamide compound 201. In FIG. 2, the absorption peak around 1.5 to 1.7 ppm is an absorption peak a2 derived from hydrogen of the methylene group that is not adjacent to the carbonyl group of adipic acid, and an absorption peak b2 derived from hydrogen of the methyl group of DL-alanine, and the absorption peaks a1 and b2 appear overlapping. FIG. 2 shows the integrated intensity of the absorption peak a2 and the absorption peak b2 added. The absorption peak around 2.5 ppm is an absorption peak c2 derived from hydrogen of the methylene group that is adjacent to the carbonyl group of adipic acid. The absorption peak around 4.5 ppm is an absorption peak d2 derived from hydrogen of the benzylmethylene group of m-xylylenediamine that is adjacent to adipic acid, and the absorption peak around 4.7 ppm is an absorption peak e2 derived from hydrogen of the benzylmethylene group of m-xylylenediamine that is adjacent to isophthalic acid. FIG. 2 shows the integrated intensity of the absorption peak d2 and the absorption peak e2 added. The absorption peak around 7.4 ppm is an absorption peak f2 derived from hydrogen of the benzene rings of m-xylylenediamine and isophthalic acid.

The amount of the DL-alanine unit in the polyamide compound is calculated from the integrated intensities of the peaks according to the following expression.

$$\text{Amount of DL-alanine unit in polyamide compound (\% by mol)} = \frac{(a2+b2-c2)/3}{[(a2+b2-c2)/3]+(c2/4)+(f2/4)} \times 100$$

The amount of the isophthalic acid unit in the polyamide compound is calculated according to the following expression.

$$\text{Amount of isophthalic acid unit in polyamide compound (\% by mol)} = \frac{(d2+e2-c2)/4}{[(a2+b2-c2)/3]+(c2/4)+(f2/4)} \times 100$$

According to the calculation, it was identified that the polyamide compound 201 contained the DL-alanine unit in an amount of approximately 8.1% by mol (9.1% by mol on calculation) and the isophthalic acid unit in an amount of approximately 2.3% by mol (2.0% by mol on calculation). Accordingly, it was identified that the polyamide compound 201 had a ratio MXDA unit/adipic acid unit/isophthalic acid unit/DL-alanine unit=43.7/45.9/2.3/8.1 (% by mol).

In Examples and Comparative Examples below, the identification of the component compositions of the polyamide compounds thus produced was performed in the same manner.

(Production of Non-Stretched Film of Polyamide Compound)

Pellets of the polyamide compound 201 were formed into a film with a single screw extruder having a diameter of 25 mm at an extrusion temperature of 260° C., a screw rotation number of 60 rpm and a withdrawing rate of 1.2 m/min, thereby producing a non-stretched film having a width of 200 mm and a thickness of from 95 to 105 μm.

Example 202

DL-2-aminobutyric acid-copolymerized N-MXD6I (polyamide compound 202, MXDA unit/adipic acid unit/isophthalic acid unit/DL-aminobutyric acid unit=48.6/46.4/2.4/2.6 (% by mol)) and a non-stretched film thereof were produced in the same manner as in Example 201 except that the α-amino acid was changed to DL-2-aminobutyric acid (DL-AABA, produced by Japan Finechem Co., Inc. purified product), and the addition amount thereof was changed to make a content thereof in the polyamide compound of 2.6% by mol.

Example 203

DL-valine-copolymerized N-MXD6I (polyamide compound 203, MXDA unit/adipic acid unit/isophthalic acid unit/DL-valine unit=48.6/46.4/2.4/2.6 (% by mol)) and a non-stretched film thereof were produced in the same manner as in Example 202 except that the α-amino acid was changed to DL-valine (produced by Sinogel Amino Acid Co., Ltd.).

Example 204

DL-leucine-copolymerized N-MXD6I (polyamide compound 204, MXDA unit/adipic acid unit/isophthalic acid unit/DL-leucine unit=48.6/46.4/2.4/2.6 (% by mol)) and a non-stretched film thereof were produced in the same manner as in Example 202 except that the α-amino acid was changed to DL-leucine (produced by Ningbo Haishuo Bio-technology Co., Ltd.).

Example 205

DL-phenylalanine-copolymerized N-MXD6I (polyamide compound 205, MXDA unit/adipic acid unit/isophthalic acid unit/DL-phenylalanine unit=48.6/46.4/2.4/2.6 (% by mol)) and a non-stretched film thereof were produced in the same manner as in Example 202 except that the α-amino acid was changed to DL-phenylalanine (DL-Phe, produced by Sinogel Amino Acid Co., Ltd.).

Example 206

DL-alanine-copolymerized N-MXD6T (polyamide compound 206, MXDA unit/adipic acid unit/terephthalic acid unit/DL-alanine unit=48.6/46.4/2.4/2.6 (% by mol)) and a non-stretched film thereof were produced in the same manner as in Example 201 except that the addition amount of DL-alanine was changed to make a content thereof in the polyamide compound of 2.6% by mol, and high purity isophthalic acid was changed to high purity terephthalic acid (PTA, produced by Mitsubishi Gas Chemical Co., Inc.).

Example 207

DL-alanine-copolymerized N-MXD6N (polyamide compound 207, MXDA unit/adipic acid unit/NDCA unit/DL-alanine unit=48.6/46.4/2.4/2.6 (% by mol)) and a non-stretched film thereof were produced in the same manner as in Example 206 except that high purity isophthalic acid was changed to 2,6-naphthalenedicarboxylic acid (NDCA, produced by Mitsubishi Gas Chemical Co., Inc.).

Example 208

DL-alanine-copolymerized N-MXD6I (polyamide compound 208, MXDA unit/adipic acid unit/isophthalic acid unit/DL-alanine unit=48.6/46.4/2.4/2.6 (% by mol)) and a non-stretched film thereof were produced in the same manner as in Example 201 except that the addition amount of DL-alanine was changed to make a content thereof in the polyamide compound of 2.6% by mol.

Example 209

DL-alanine-copolymerized N-MXD6I (polyamide compound 209, MXDA unit/adipic acid unit/isophthalic acid unit/DL-alanine unit=48.6/43.9/4.9/2.6 (% by mol)) and a non-stretched film thereof were produced in the same manner as in Example 208 except that the addition amount of high purity isophthalic acid was changed to make a content thereof in the polyamide compound of 4.9% by mol.

Example 210

DL-alanine-copolymerized N-MXD6I (polyamide compound 210, MXDA unit/adipic acid unit/isophthalic acid unit/DL-alanine unit=48.6/41.5/7.3/2.6 (% by mol)) and a non-stretched film thereof were produced in the same manner as in Example 208 except that the addition amount of high purity isophthalic acid was changed to make a content thereof in the polyamide compound of 7.3% by mol.

Example 211

DL-alanine-copolymerized N-MXD6I (polyamide compound 211, MXDA unit/adipic acid unit/isophthalic acid unit/DL-alanine unit=48.6/34.2/14.6/2.6 (% by mol)) and a non-stretched film thereof were produced in the same manner as in Example 208 except that the addition amount of high purity isophthalic acid was changed to make a content thereof in the polyamide compound of 14.6% by mol.

Example 212

DL-alanine-copolymerized N-MXD6I (polyamide compound 212, MXDA unit/adipic acid unit/isophthalic acid unit/DL-alanine unit=45.9/41.4/4.6/8.1 (% by mol)) and a non-stretched film thereof were produced in the same manner as in Example 201 except that the addition amount of high purity isophthalic acid was changed to make a content thereof in the polyamide compound of 4.6% by mol.

Example 213

DL-alanine-copolymerized N-MXD6I (polyamide compound 213, MXDA unit/adipic acid unit/isophthalic acid unit/DL-alanine unit=45.9/39.1/6.9/8.1 (% by mol)) and a non-stretched film thereof were produced in the same manner as in Example 201 except that the addition amount of high purity isophthalic acid was changed to make a content thereof in the polyamide compound of 6.9% by mol.

Example 214

DL-alanine-copolymerized N-MXD6I (polyamide compound 214, MXDA unit/adipic acid unit/isophthalic acid unit/DL-alanine unit=45.9/32.2/13.8/8.1 (% by mol)) was produced in the same manner as in Example 201 except that the addition amount of high purity isophthalic acid was changed to make a content thereof in the polyamide compound of 13.8% by mol. The molecular weight thereof was not sufficiently increased on polymerization, and thus the measurement of oxygen permeability coefficient and haze and the tensile test for a non-stretched film were not performed.

Example 215

DL-alanine-copolymerized N-MXD6I (polyamide compound 215, MXDA unit/adipic acid unit/isophthalic acid unit/DL-alanine unit=41.1/39.1/2.1/17.7 (% by mol)) was produced in the same manner as in Example 201 except that the addition amount of DL-alanine was changed to make a content thereof in the polyamide compound of 17.7% by mol. The molecular weight thereof was not sufficiently increased on polymerization, and thus the measurement of oxygen permeability coefficient and haze and the tensile test for a non-stretched film were not performed.

Example 216

DL-alanine-copolymerized N-MXD6I (polyamide compound 216, MXDA unit/adipic acid unit/isophthalic acid unit/DL-alanine unit=41.1/37.1/4.1/17.7 (% by mol)) was produced in the same manner as in Example 215 except that the addition amount of high purity isophthalic acid was changed to make a content thereof in the polyamide compound of 4.1% by mol. The molecular weight thereof was not sufficiently increased on polymerization, and thus the measurement of oxygen permeability coefficient and haze and the tensile test for a non-stretched film were not performed.

Example 217

DL-alanine-copolymerized N-MXD6I (polyamide compound 217, MXDA unit/adipic acid unit/isophthalic acid unit/DL-alanine unit=41.1/35.0/6.2/17.7 (% by mol)) was produced in the same manner as in Example 215 except that the addition amount of high purity isophthalic acid was changed to make a content thereof in the polyamide compound of 6.2% by mol. The molecular weight thereof was not sufficiently increased on polymerization, and thus the measurement of oxygen permeability coefficient and haze and the tensile test for a non-stretched film were not performed.

Example 218

DL-alanine-copolymerized N-MXD10I (polyamide compound 218, MXDA unit/sebacic acid unit/isophthalic acid unit/DL-alanine unit=48.6/46.4/2.4/2.6 (% by mol)) and a non-stretched film thereof were produced in the same manner as in Example 208 except that adipic acid was changed to sebacic acid (produced by Itoh Oil Chemicals Co., Ltd.).

Example 219

DL-alanine-copolymerized N-MXD12I (polyamide compound 219, MXDA unit/dodecanedioic acid unit/isophthalic acid unit/DL-alanine unit=48.6/46.4/2.4/2.6 (% by mol)) and a non-stretched film thereof were produced in the same manner as in Example 208 except that adipic acid was changed to dodecanedioic acid (produced by Ube Industries, Ltd.).

Example 220

DL-alanine-copolymerized N-MXD6I (polyamide compound 220, MXDA unit/adipic acid unit/isophthalic acid unit/DL-alanine unit=34.1/18.9/15.4/31.6 (% by mol)) was produced in the same manner as in Example 201 except that the addition amount of DL-alanine was changed to make a content thereof in the polyamide compound of 31.6% by mol. The molecular weight thereof was not sufficiently increased on polymerization, and thus the measurement of oxygen permeability coefficient and haze, sensory test and the tensile test for a non-stretched film were not performed.

Comparative Example 201

Melt Polymerization of Polyamide Compound by Atmospheric Dropping Method

In a reaction vessel having an inner capacity of 50 L, equipped with a stirrer, a partial condenser, a total condenser, a thermometer, a dropping funnel, a nitrogen introducing tube and a strand die, 13,000 g (88.9 mol) of precisely weighed adipic acid (produced by Asahi Kasei Chemicals Corporation), 777.9 g (4.68 mol) of high purity isophthalic acid (produced by A.G. International Chemical Co., Inc.), 11.96 g (0.113 mol) of sodium hypophosphite and 6.21 g (0.0756 mol) of sodium acetate were placed, and after sufficiently replacing with nitrogen, the system was heated to 170° C. under a small amount of a nitrogen stream under stirring. 12,710 g (93.4 mol) of m-xylylenediamine (produced by Mitsubishi Gas Chemical Co., Inc.) was added dropwise thereto under stirring, and the system was continuously heated while removing condensation water formed. After completing the dropwise addition of m-xylylenediamine, the reaction was continued at an inner temperature of 260° C. for 40 minutes. Thereafter, the system was pressurized with nitrogen, and the polymer was taken out from the strand die and pelletized, thereby providing approximately 23.2 kg of a polyamide compound.

(Solid Phase Polymerization of Polyamide Compound)

The polyamide compound was charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 200° C. over approximately 70 minutes, and then maintained at 200° C. for 30 minutes. Nitrogen gas having a purity of 99% by volume or more was introduced into the system, and the tumble dryer was cooled while rotating, thereby providing N-MXD6I (polyamide compound 221, MXDA unit/adipic acid unit/isophthalic acid unit=49.9/47.6/2.5 (% by mol)).

(Production of Non-Stretched Film of Polyamide Compound)

Pellets of the polyamide compound 221 were formed into a film with a single screw extruder having a diameter of 25 mm at an extrusion temperature of 260° C., a screw rotation number of 60 rpm and a withdrawing rate of 1.2 m/min, thereby producing a non-stretched film having a width of 200 mm and a thickness of from 95 to 105 μm.

Comparative Example 202

N-MXD10I (polyamide compound 222, MXDA unit/sebacic acid unit/isophthalic acid unit=49.9/47.6/2.5 (% by mol)) and a non-stretched film thereof were produced in the same manner as in Comparative Example 201 except that adipic acid was changed to sebacic acid (produced by Itch Oil Chemicals Co., Ltd.).

Comparative Example 203

N-MXD12I (polyamide compound 223, MXDA unit/dodecanedioic acid unit/isophthalic acid unit=49.9/47.6/2.5 (% by mol)) and a non-stretched film thereof were produced in the same manner as in Comparative Example 201 except that adipic acid was changed to dodecanedioic acid (produced by Ube Industries, Ltd.).

Comparative Example 204

Glycine-copolymerized N-MXD6I (polyamide compound 224, MXDA unit/adipic acid unit/isophthalic acid unit/glycine unit=45.9/43.7/2.3/8.1 (% by mol)) and a non-stretched film thereof were produced in the same manner as in Example 201 except that the α-amino acid was changed to glycine (produced by Tokyo Chemical Industry Co., Ltd. reagent) having secondary hydrogen on the α-position.

Comparative Example 205

2-Aminoisobutylic acid-copolymerized N-MXD6I (polyamide compound 225, MXDA unit/adipic acid unit/isophthalic acid unit/AIB unit=45.9/43.7/2.3/8.1 (% by mol)) and a non-stretched film thereof were produced in the same manner as in Example 201 except that the α-amino acid was changed to 2-aminoisobutylic acid (2-amino-2-methylpropanoic acid, AIB, produced by Japan Finechem Co., Inc., purified product) having no hydrogen on the α-position.

Comparative Example 206

To the polyamide compound 221, cobalt stearate was added to make a cobalt content in the resin composition of 400 ppm, and dry-mixed. The resulting mixture was formed into a film with a twin screw extruder having a diameter of 30 mm at an extrusion temperature of 260° C., a screw rotation number of 60 rpm, a feed screw rotation number of 12 rpm and a withdrawing rate of 1.8 m/min, thereby producing a non-stretched film having a width of 200 mm and a thickness of from 95 to 105 μm.

Comparative Example 207

To 100 parts by mass of the polyamide compound 221, 5 parts by mass of maleic acid-modified polybutadiene (PB) (M-2000-20, a trade name, produced by Nippon Petrochemicals Co., Ltd.) and cobalt stearate in an amount that made a cobalt content in the resin composition of 400 ppm were added, and dry-mixed. The resulting mixture was formed into a film with a twin screw extruder having a diameter of 30 mm at an extrusion temperature of 260° C., a screw rotation number of 60 rpm, a feed screw rotation number of 14 rpm and a withdrawing rate of 2.0 m/min, thereby producing a non-stretched film having a width of 200 mm and a thickness of from 95 to 105 μm.

Comparative Example 208

To 100 parts by mass of the polyamide compound 221, DL-alanine (produced by Musashino Chemical Laboratory, Ltd.) was added to make a content thereof in the resin composition of 5 parts by mass, and dry-mixed. The resulting mixture, which was prevented from being copolymerized, was formed into a film with a small-sized single screw extruder having a diameter of 15 mm at an extrusion temperature of 240° C., a screw rotation number of 30 rpm, a feed screw rotation number of 14 rpm and a withdrawing rate of 1.0 m/min, thereby producing a non-stretched film having a width of 110 mm and a thickness of from 95 to 105 p.m.

TABLE 3

| | Polyamide | Amino acid content (% by mol) | Aromatic dicarboxylic acid copolymerization ratio (% by mol) | Relative viscosity | Tg (° C.) | Tm (° C.) | Oxygen absorbing amount (cc/g) 40° C., 28 days | Oxygen permeability Coefficient of film** | Sensory test evaluation | Tensile breaking strength (MPa) Before oxygen absorption | Tensile breaking strength (MPa) After oxygen absorption | Haze |
|---|---|---|---|---|---|---|---|---|---|---|---|---|
| Example 201 | DL-alanine-copolymerized N-MXD6I | 8.1 | 2.3 | 2.0 | 90 | N.D. | 18 | 0.001 | 1 | 79 | 68 | 1.9 |
| Example 202 | DL-AABA*¹-copolymerized N-MXD6I | 2.6 | 2.4 | 2.6 | 90 | 225 | 10 | 0.003 | 1 | 79 | 71 | 1.2 |
| Example 203 | DL-valine-copolymerized N-MXD6I | 2.6 | 2.4 | 2.6 | 90 | 224 | 8 | 0.003 | 1 | 77 | 69 | 1.1 |
| Example 204 | DL-leucine-copolymerized N-MXD6I | 2.6 | 2.4 | 2.2 | 90 | 226 | 8 | 0.003 | 1 | 76 | 68 | 1.1 |
| Example 205 | DL-Phe*²-copolymerized N-MXD6I | 2.6 | 2.4 | 2.6 | 91 | 225 | 9 | 0.002 | 1 | 79 | 72 | 1.9 |
| Example 206 | DL-alanine-copolymerized N-MXD6I | 2.6 | 2.4 | 2.4 | 90 | 225 | 9 | 0.002 | 1 | 81 | 73 | 1.5 |
| Example 207 | DL-alanine-copolymerized N-MXD6I | 2.6 | 2.4 | 2.3 | 94 | 220 | 9 | 0.002 | 1 | 84 | 74 | 2.1 |
| Example 208 | DL-alanine-copolymerized N-MXD6I | 2.6 | 2.4 | 2.6 | 90 | 225 | 12 | 0.001 | 1 | 79 | 68 | 1.5 |
| Example 209 | DL-alanine-copolymerized N-MXD6I | 2.6 | 4.9 | 2.6 | 94 | 221 | 9 | 0.001 | 1 | 80 | 73 | 1.3 |
| Example 210 | DL-alanine-copolymerized N-MXD6I | 2.6 | 7.3 | 2.4 | 98 | N.D. | 8 | 0.003 | 1 | 71 | 60 | 1.2 |
| Example 211 | DL-alanine-copolymerized N-MXD6I | 2.6 | 14.6 | 2.2 | 110 | N.D. | 8 | 0.004 | 1 | 70 | 62 | 1.0 |
| Example 212 | DL-alanine-copolymerized N-MXD6I | 8.1 | 4.6 | 2.1 | 94 | N.D. | 19 | 0.001 | 1 | 80 | 70 | 1.8 |
| Example 213 | DL-alanine-copolymerized N-MXD6I | 8.1 | 6.9 | 1.9 | 98 | N.D. | 18 | 0.001 | 1 | 76 | 63 | 2.3 |
| Example 214 | DL-alanine-copolymerized N-MXD6I | 8.1 | 13.8 | 1.6 | 110 | N.D. | 17 | — | 1 | — | — | — |
| Example 215 | DL-alanine-copolymerized N-MXD6I | 17.7 | 2.1 | 1.5 | 90 | N.D. | 36 | — | 1 | — | — | — |
| Example 216 | DL-alanine-copolymerized N-MXD6I | 17.7 | 4.1 | 1.5 | 94 | N.D. | 36 | — | 1 | — | — | — |
| Example 217 | DL-alanine-copolymerized N-MXD6I | 17.7 | 6.2 | 1.5 | 98 | N.D. | 36 | — | 1 | — | — | — |
| Example 218 | DL-alanine-copolymerized N-MXD10I | 2.6 | 2.4 | 2.3 | 63 | 185 | 10 | 0.8 | 1 | 40 | 32 | 2.2 |
| Example 219 | DL-alanine-copolymerized N-MXD12I | 2.6 | 2.4 | 2.3 | 56 | 182 | 12 | 1.7 | 1 | 35 | 28 | 1.5 |
| Example 220 | DL-alanine-copolymerized N-MXD6I | 31.6 | 15.4 | 1.2 | N.D. | N.D. | 83 | — | — | — | — | — |
| Comparative Example 201 | N-MXD6I | 0 | 2.5 | 2.6 | 91 | 229 | 0 | 0.07 | 1 | 82 | 80 | 1.8 |
| Comparative Example 202 | MXD10I | 0 | 2.5 | 2.6 | 64 | 187 | 0 | 1.9 | 1 | 247 | 246 | 1.3 |
| Comparative Example 203 | MXD12I | 0 | 2.5 | 2.6 | 57 | 189 | 0 | 2.8 | 1 | 250 | 250 | 1.2 |

TABLE 3-continued

| | Polyamide | Amino acid content (% by mol) | Aromatic dicarboxylic acid copolymerization ratio (% by mol) | Relative viscosity | Tg (°C.) | Tm (°C.) | Oxygen absorbing amount (cc/g) 40° C., 28 days | Oxygen permeability Coefficient of film** | Sensory test evaluation | Tensile breaking strength (MPa) Before oxygen absorption | Tensile breaking strength (MPa) After oxygen absorption | Haze |
|---|---|---|---|---|---|---|---|---|---|---|---|---|
| Comparative Example 204 | glycine-copolymerized N-MXD6I | 8.1 | 2.3 | 2.5 | 90 | N.D. | 2 | 0.07 | 1 | 83 | 80 | 1.8 |
| Comparative Example 205 | AIB*3-copolymerized MXD6I | 8.1 | 2.3 | 2.6 | 90 | N.D. | 0 | 0.08 | 1 | 79 | 77 | 1.7 |
| Comparative Example 206 | N-MXD6I (Co mixed)*4 | 0 | 2.5 | 2.6 | 91 | 229 | 12 | 0.001 | 2 | 83 | 0 | 1.9 |
| Comparative Example 207 | N-MXD6I (Co + PB mixed)*5 | 0 | 2.5 | 2.6 | 91 | 229 | 17 | 0.001 | 3 | 78 | 18 | 2.5 |
| Comparative Example 208 | N-MXD6I (DL-alanine mixed)*6 | 0 | 2.5 | 2.6 | 91 | 229 | 0 | 0.07 | 1 | 83 | 83 | 1.9 |

**unit of oxygen permeability coefficient cc · mm/(m$^2$ · day · atm)
*[1]DL-AABA: DL-2-aminobutyric acid
*[2]DL-Phe: DL-phenylalanine
*[3]AIB: 2-aminoisobutyric acid
*[4]400 ppm of Co mixed
*[5]400 ppm of Co and 5 parts by mass of maleic acid-modified polybutadiene mixed
*[6]5 parts by mass of DL-alanine mixed
N.D.: not detected The polyamide compound that is produced by copolymerizing only an aromatic dicarboxylic acid is insufficient in oxygen absorbing capability (Comparative Examples 201 to 203). The polyamide compound that is copolymerized with an α-amino acid having no tertiary hydrogen is similarly insufficient in oxygen absorbing capability (Comparative Examples 204 and 205). The ordinary polyamide composition having a cobalt compound mixed therein exhibits an oxygen absorbing capability and a good oxygen permeability coefficient, but has bluish color due to the addition of the cobalt compound although it has good transparency, and causes a large amount of odor especially in one using polybutadiene. Furthermore, the film after oxygen absorption is deteriorated to fail to maintain the shape thereof, and thus is not necessarily favorable in the purpose of packaging containers (Comparative Examples 206 and 207). The polyamide composition that is only mixed with an α-amino acid having tertiary hydrogen, but is not copolymerized therewith exhibits no oxygen absorbing capability (Comparative Example 208).

On the other hand, the polyamide compound that is copolymerized with an α-amino acid having tertiary hydrogen and aromatic dicarboxylic acid exhibits a sufficient oxygen absorbing capability without a metal contained, and generates no offensive odor (Examples 201 to 220). In the case of the film specimen, in particular, the film has a good oxygen permeability coefficient, has good transparency, and maintains the mechanical properties after oxygen absorption (Examples 201 to 213, 218 and 219). The polyamide compound of Example 220 exhibits a considerably good oxygen absorbing capability although the molecular weight thereof is not increased.

Examples 218 and 219 using sebacic acid or dodecanedioic acid as the linear aliphatic dicarboxylic acid component have a lower oxygen absorbing capability than Examples using adipic acid, but in comparison to N-MXD10I (Comparative Example 202) and N-MXD12I (Comparative Example 203) having no α-amino acid having tertiary hydrogen copolymerized therewith, have an excellent oxygen absorbing capability.

Example 301

Melt Polymerization of Polyamide Compound by Atmospheric Dropping Method

In a reaction vessel having an inner capacity of 50 L, equipped with a stirrer, a partial condenser, a total condenser, a thermometer, a dropping funnel, a nitrogen introducing tube and a strand die, 13,000 g (89.0 mol) of precisely weighed adipic acid (produced by Asahi Kasei Chemicals Corporation), 880.56 g (9.88 mol) of DL-alanine (produced by Musashino Chemical Laboratory, Ltd.), 4,314.10 g (38.1 mol) of ε-caprolactam (produced by Ube Industries, Ltd.), 13.75 g (0.13 mol) of sodium hypophosphite and 7.13 g (0.087 mol) of sodium acetate were placed, and after sufficiently replacing with nitrogen, the system was heated to 170° C. under a small amount of a nitrogen stream under stirring. 12,433 g (88.7 mol) of m-xylylenediamine (produced by Mitsubishi Gas Chemical Co., Inc.) was added dropwise thereto under stirring, and the system was continuously heated while removing condensation water formed. After completing the dropwise addition of m-xylylenediamine, the reaction was continued at an inner temperature of 260° C. for 40 minutes. Thereafter, the system was pressurized with nitrogen, and the polymer was taken out from the strand die and pelletized, thereby providing approximately 26 kg of a polyamide compound.

(Solid Phase Polymerization of Polyamide Compound)

The polyamide compound and 0.5% by mass of water were charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 180° C. over approximately 70 minutes, and then maintained at 180° C. for 30 minutes. Nitrogen gas having a purity of 99% by volume or more was introduced into the system, and the tumble dryer was cooled while rotating, thereby providing DL-alanine-copolymerized N-MXD6,6 (polyamide compound 301, MXDA unit/adipic acid unit/DL-alanine unit/ε-caprolactam unit=39.3/39.4/4.4/16.9 (% by mol)).

Example 302

D-alanine-copolymerized N-MXD6,6 (polyamide compound 302, MXDA unit/adipic acid unit/D-alanine unit/ε-caprolactam unit=39.3/39.4/4.4/16.9 (% by mol)) was produced in the same manner as in Example 301 except that DL-alanine was changed to D-alanine.

Example 303

L-alanine-copolymerized N-MXD6,6 (polyamide compound 303, MXDA unit/adipic acid unit/L-alanine units-caprolactam unit=39.3/39.4/4.4/16.9 (% by mol)) was produced in the same manner as in Example 301 except that DL-alanine was changed to L-alanine.

Example 304

DL-alanine-copolymerized N-MXD6,6 (polyamide compound 304, MXDA unit/adipic acid unit/DL-alanine unit/ε-caprolactam unit=40.8/40.9/0.8/17.5 (% by mol)) was produced in the same manner as in Example 301 except that the addition amount of DL-alanine was changed to make a content thereof in the polyamide compound of 0.8% by mol, and the addition amount of ε-caprolactam was changed to make a content thereof in the polyamide compound of 17.5% by mol.

Example 305

DL-alanine-copolymerized N-MXD6,6 (polyamide compound 305, MXDA unit/adipic acid unit/DL-alanine unit/s-caprolactam unit=34.8/35.2/15.0/15.0 (% by mol)) was produced in the same manner as in Example 301 except that the addition amount of DL-alanine was changed to make a content thereof in the polyamide compound of 15.0% by mol, and the addition amount of ε-caprolactam was changed to make a content thereof in the polyamide compound of 15.0% by mol.

Example 306

DL-alanine-copolymerized N-MXD6,6 (polyamide compound 306, MXDA unit/adipic acid unit/DL-alanine unit/s-caprolactam unit=28.9/29.3/29.3/12.5 (% by mol)) was produced in the same manner as in Example 301 except that the addition amount of DL-alanine was changed to make a content thereof in the polyamide compound of 29.2% by mol, and the addition amount of s-caprolactam was changed to make a content thereof in the polyamide compound of 12.5% by mol.

Example 307

DL-alanine-copolymerized N-MXD6,6 (polyamide compound 307, MXDA unit/adipic acid unit/DL-alanine unit/s-caprolactam unit=20.7/21.1/49.2/9.0 (% by mol)) was produced in the same manner as in Example 301 except that the addition amount of DL-alanine was changed to make a content thereof in the polyamide compound of 49.2% by mol, and the addition amount of ε-caprolactam was changed to make a content thereof in the polyamide compound of 9.0% by mol.

Example 308

DL-alanine-copolymerized N-MXD6,6 (polyamide compound 308, MXDA unit/adipic acid unit/DL-alanine unit/ε-caprolactam unit=32.0/32.2/3.6/32.2 (% by mol)) was produced in the same manner as in Example 301 except that the addition amount of DL-alanine was changed to make a content thereof in the polyamide compound of 3.6% by mol, and the addition amount of ε-caprolactam was changed to make a content thereof in the polyamide compound of 32.2% by mol.

Example 309

DL-alanine-copolymerized N-MXD6,6 (polyamide compound 309, MXDA unit/adipic acid unit/DL-alanine unit/ε-caprolactam unit=44.9/45.1/5.0/5.0 (% by mol)) was produced in the same manner as in Example 301 except that the addition amount of DL-alanine was changed to make a content thereof in the polyamide compound of 5.0% by mol, and the addition amount of ε-caprolactam was changed to make a content thereof in the polyamide compound of 5.0% by mol.

Example 310

DL-alanine-copolymerized N-MXD6,12 (polyamide compound 310, MXDA unit/adipic acid unit/DL-alanine unit/laurolactam unit=39.3/39.4/4.4/16.9 (% by mol)) was produced in the same manner as in Example 301 except that ε-caprolactam was changed to laurolactam (produced by Ube Industries, Ltd.).

Example 311

DL-2-aminobutyric acid-copolymerized N-MXD6,6 (polyamide compound 311, MXDA unit/adipic acid unit/DL-AABA unit/ε-caprolactam unit=39.3/39.4/4.4/16.9 (% by mol)) was produced in the same manner as in Example 301 except that the α-amino acid was changed to DL-2-aminobutyric acid (DL-AABA, produced by Japan Finechem Co., Inc., purified product).

Example 312

DL-leucine-copolymerized N-MXD6,6 (polyamide compound 312, MXDA unit/adipic acid unit/DL-leucine unit/ε-caprolactam unit=39.3/39.4/4.4/16.9 (% by mol)) was produced in the same manner as in Example 301 except that the α-amino acid was changed to DL-leucine (produced by Ningbo Haishuo Bio-technology Co., Ltd.).

Example 313

DL-phenylalanine-copolymerized N-MXD6,6 (polyamide compound 313, MXDA unit/adipic acid unit/DL-phenylalanine unit/ε-caprolactam unit=39.3/39.4/4.4/16.9 (% by mol)) was produced in the same manner as in Example 301 except that the α-amino acid was changed to DL-phenylalanine (DL-Phe, produced by Sinogel Amino Acid Co., Ltd.).

Example 314

DL-alanine-copolymerized N-MXD10,6 (polyamide compound 314, MXDA unit/sebacic acid unit/DL-alanine unit/ε-caprolactam unit=39.3/39.4/4.4/16.9 (% by mol)) was produced in the same manner as in Example 301 except that adipic acid was changed to sebacic acid (produced by Itoh Oil Chemicals Co., Ltd.).

Example 315

DL-alanine-copolymerized N-MXD12,6 (polyamide compound 315, MXDA unit/dodecanedioic acid unit/DL-alanine unit/ε-caprolactam unit=39.3/39.4/4.4/16.9 (% by mol)) was produced in the same manner as in Example 301 except that adipic acid was changed to dodecanedioic acid (produced by Ube Industries, Ltd.).

Comparative Example 301

Melt Polymerization of Polyamide Compound by Atmospheric Dropping Method

In a reaction vessel having an inner capacity of 50 L, equipped with a stirrer, a partial condenser, a total condenser, a thermometer, a dropping funnel, a nitrogen introducing tube and a strand die, 13,000 g (89.0 mol) of precisely weighed adipic acid (produced by Asahi Kasei Chemicals Corporation), 4,314.1 g (38.1 mol) of ε-caprolactam (produced by Ube Industries, Ltd.), 13.4 g (0.13 mol) of sodium hypophosphite and 6.9 g (0.084 mol) of sodium acetate were placed, and after sufficiently replacing with nitrogen, the system was heated to 170° C. under a small amount of a nitrogen stream under stirring. 12,437 g (88.7 mol) of m-xylylenediamine (MXDA) (produced by Mitsubishi Gas Chemical Co., Inc.) was added dropwise thereto under stirring, and the system was continuously heated while removing condensation water formed. After completing the dropwise addition of 1,3-bis (aminomethyl)cyclohexane, the reaction was continued at an inner temperature of 260° C. for 40 minutes. Thereafter, the system was pressurized with nitrogen, and the polymer was taken out from the strand die and pelletized, thereby providing approximately 26 kg of a polyamide compound.
(Solid Phase Polymerization of Polyamide Compound)

The polyamide compound and 0.5% by mass of water were charged in a tumble dryer with a jacket, equipped with a nitrogen introducing tube, a vacuum line, a vacuum pump and a thermocouple for measuring the inner temperature, and while rotating the tumble dryer at a constant rate, the inside of the tumble dryer was sufficiently replaced with nitrogen gas having a purity of 99% by volume or more, and the tumble dryer was heated under a stream of the nitrogen gas, thereby increasing the temperature of the pellets to 150° C. over approximately 150 minutes. At the time when the temperature of the pellets reached 150° C., the pressure inside the system was decreased to 1 torr or less. While further increasing the temperature, the temperature of the pellets was increased to 180° C. over approximately 70 minutes, and then maintained at 180° C. for 30 minutes. Nitrogen gas having a purity of 99% by volume or more was introduced into the system, and the tumble dryer was cooled while rotating, thereby providing N-MXD6,6 (polyamide compound 316, MXDA unit/adipic acid unit/ε-caprolactam unit=41.1/41.2/17.7 (% by mol)).

Comparative Example 302

Glycine-copolymerized N-MXD6,6 (polyamide compound 317, MXDA unit/adipic acid unit/glycine unit/ε-caprolactam unit=39.3/39.4/4.4/16.9 (% by mol)) was produced in the same manner as in Example 301 except that the DL-alanine was changed to glycine (produced by Tokyo Chemical Industry Co., Ltd.) having secondary hydrogen on the α-position.

Comparative Example 303

2-Aminoisobutylic acid-copolymerized N-MXD6,6 (polyamide compound 318, MXDA unit/adipic acid unit/AIB unit/ε-caprolactam unit=39.3/39.4/4.4/16.9 (% by mol)) was produced in the same manner as in Example 301 except that DL-alanine was changed to 2-aminoisobutylic acid (2-amino-2-methylpropanoic acid, AIB, produced by Japan Finechem Co., Inc., purified product) having no hydrogen on the α-position.

Comparative Example 304

N-MXD6,12 (polyamide compound 319, MXDA unit/adipic acid unit/laurolactam unit=41.1/41.2/17.7 (% by mol)) was produced in the same manner as in Comparative Example 301 except that ε-caprolactam was changed to laurolactam (produced by Ube Industries, Ltd.).

Comparative Example 305

N-MXD10,6 (polyamide compound 320, MXDA unit/sebacic acid unit's-caprolactam unit=41.1/41.2/17.7 (% by mol)) was produced in the same manner as in Comparative Example 301 except that adipic acid was changed to sebacic acid (produced by Itoh Oil Chemicals Co., Ltd.).

Comparative Example 306

N-MXD12,6 (polyamide compound 321, MXDA unit/dodecanedioic acid unit/ε-caprolactam unit=41.1/41.2/17.7 (% by mol)) was produced in the same manner as in Comparative Example 301 except that adipic acid was changed to dodecanedioic acid (produced by Ube Industries, Ltd.).

Comparative Example 307

To the polyamide compound 316 obtained in Comparative Example 301, DL-alanine (produced by Musashino Chemical Laboratory, Ltd.) was added and dry-mixed, thereby providing a mixture of the polyamide compound and DL-alanine (content of DL-alanine in the mixture: 5% by mass). The resulting mixture, which was prevented from being copolymerized, was extruded with a small-sized single screw extruder having a diameter of 15 mm at an extrusion temperature of 240° C., a screw rotation number of 30 rpm and a feed screw rotation number of 14 rpm, thereby producing pellets of a DL-alanine-containing N-MXD6,6.

TABLE 4

| | Polyamide | Amino acid content (% by mol) | Aminocarboxylic acid copolymerization ratio (% by mol) | Relative viscosity | Tg (° C.) | Tm (° C.) | Oxygen absorbing amount (cc/g) 40° C., 28 days |
|---|---|---|---|---|---|---|---|
| Example 301 | DL-alanine-copolymerized N-MXD6,6 | 4.4 | 16.9 | 2.1 | 75 | 197 | 8 |
| Example 302 | D-alanine-copolymerized N-MXD6,6 | 4.4 | 16.9 | 2.1 | 75 | 197 | 8 |
| Example 303 | L-alanine-copolymerized N-MXD6,6 | 4.4 | 16.9 | 2.1 | 75 | 197 | 8 |
| Example 304 | DL-alanine-copolymerized N-MXD6,6 | 0.8 | 17.5 | 2.1 | 76 | 200 | 3 |
| Example 305 | DL-alanine-copolymerized N-MXD6,6 | 15.0 | 15.0 | 1.9 | 75 | N.D. | 23 |
| Example 306 | DL-alanine-copolymerized N-MXD6,6 | 29.3 | 12.5 | 1.8 | 75 | N.D. | 45 |
| Example 307 | DL-alanine-copolymerized N-MXD6,6 | 49.2 | 9.0 | 1.6 | 75 | N.D. | 67 |
| Example 308 | DL-alanine-copolymerized N-MXD6,6 | 3.6 | 32.2 | 1.8 | 62 | N.D. | 8 |
| Example 309 | DL-alanine-copolymerized N-MXD6,6 | 5.0 | 5.0 | 2.1 | 81 | 228 | 9 |
| Example 310 | DL-alanine-copolymerized N-MXD6,12 | 4.4 | 16.9 | 2.1 | 69 | N.D. | 6 |
| Example 311 | DL-AABA[*1]-copolymerized N-MXD6,6 | 4.4 | 16.9 | 2.1 | 75 | 197 | 8 |
| Example 312 | DL-leucine-copolymerized N-MXD6,6 | 4.4 | 16.9 | 2.1 | 75 | 197 | 8 |
| Example 313 | DL-Phe[*2]-copolymerized N-MXD6,6 | 4.4 | 16.9 | 2.1 | 75 | 197 | 9 |
| Example 314 | DL-alanine-copolymerized N-MXD10,6 | 4.4 | 16.9 | 2.1 | 77 | N.D. | 10 |
| Example 315 | DL-alanine-copolymerized N-MXD12,6 | 4.4 | 16.9 | 2.1 | 73 | N.D. | 11 |
| Comparative Example 301 | N-MXD6,6 | 0 | 17.7 | 2.1 | 75 | 203 | 0 |
| Comparative Example 302 | glycine-copolymerized N-MXD6,6 | 4.4 | 16.9 | 2.1 | 75 | 197 | 0 |
| Comparative Example 303 | AIB[*3]-copolymerized N-MXD6,6 | 4.4 | 16.9 | 2.1 | 75 | 196 | 0 |
| Comparative Example 304 | N-MXD6,12 | 0 | 17.7 | 2.1 | 69 | N.D. | 0 |
| Comparative Example 305 | N-MXD10,6 | 0 | 17.7 | 2.1 | 77 | 201 | 0 |
| Comparative Example 306 | N-MXD12,6 | 0 | 17.7 | 2.1 | 73 | N.D. | 0 |
| Comparative Example 307 | N-MXD6,6 (DL-alanine mixed)[*7] | 0 | 17.7 | 2.1 | 75 | 200 | 1 |

[*1]DL-AABA; DL-2-aminobutyric acid
[*2]DL-Phe: DL-phenylalanine
[*3]AIB: 2-aminoisobutyric acid
[*7]mixture of N-MXD6,6 and DL-alanine (DL-alanine content 5% by mass)
N.D.: not detected The polyamide compound that is copolymerized with an α-amino acid having no tertiary hydrogen is insufficient in oxygen absorbing capability (Comparative Examples 302 and 303). The polyamide compound that is not copolymerized with an α-amino acid having tertiary hydrogen and the polyamide composition that is only mixed with an α-amino acid having tertiary hydrogen, but is not copolymerized therewith exhibits no oxygen absorbing capability (Comparative Examples 301, 304 to 306 and 307).

On the other hand, the polyamide compound that is copolymerized with an α-amino acid having tertiary hydrogen exhibits a sufficient oxygen absorbing capability without a metal contained (Examples 301 to 315).

Examples 401 to 416 and Comparative Examples 401 to 407

Melt Polymerization of Polyamide Oligomer by Atmospheric Dropping Method

In a reaction vessel having an inner capacity of 50 L, equipped with a stirrer, a partial condenser, a total condenser, a thermometer, a dropping funnel, a nitrogen introducing tube and a strand die, an aliphatic dicarboxylic acid, an aromatic dicarboxylic acid, an α-amino acid, an ω-aminocarboxylic acid, sodium hypophosphite and sodium acetate of the kinds and the amounts shown in Table 5 were charged, and after sufficiently replacing with nitrogen, the system was heated to 170° C. under a small amount of a nitrogen stream under stirring. m-xylylenediamine as an aromatic diamine in the amounts shown in Table 5 was added dropwise thereto under stirring, and the system was continuously heated while removing condensation water formed. After completing the dropwise addition of the diamine, the reaction was continued at an inner temperature of 240° C. for 40 to 60 minutes while taking care of increase of the torque. Thereafter, the system was pressurized with nitrogen, and the polyamide oligomer was taken out from the strand die. One that was taken out in the form of strand and was pelletized, thereby providing a polyamide oligomer in the form of pellets. One that was not taken out in the form of strand due to the low molecular weight and was separately pulverized with a pulverizer, thereby providing a pulverized product of a polyamide oligomer.

TABLE 5

| | | | Example | | | | | |
|---|---|---|---|---|---|---|---|---|
| | | | 401 | 402 | 403 | 404 | 405 | 406 |
| Aromatic diamine | MXDA | g | 12,500 | 12,500 | 12,500 | 12,500 | 12,500 | 12,500 |
| | | mol | 91.8 | 91.8 | 91.8 | 91.8 | 91.8 | 91.8 |
| Aliphatic dicarboxylic acid | adipic acid | g | 13,827 | 13,827 | 13,827 | 14,422 | 14,903 | 13,827 |
| | | mol | 94.6 | 94.6 | 94.6 | 98.6 | 102.0 | 94.6 |
| | sebacic acid | g | | | | | | |
| | | mol | | | | | | |
| | dodecanedioic acid | g | | | | | | |
| | | mol | | | | | | |
| Aromatic dicarboxylic acid | isophthalic acid | g | | | | | | |
| | | mol | | | | | | |
| | terephthalic acid | g | | | | | | |
| | | mol | | | | | | |
| | 2,6-naphthalene-dicarboxylic acid | g | | | | | | |
| | | mol | | | | | | |
| Amino acid | DL-alanine | g | 430 | 909 | 2,044 | 2,044 | 2,044 | |
| | | mol | 4.8 | 10.2 | 22.9 | 22.9 | 22.9 | |
| | DL-2-amino butyric acid | g | | | | | | 2,366 |
| | | mol | | | | | | 22.94 |
| | DL-phenylalanine | g | | | | | | |
| | | mol | | | | | | |
| | glycine | g | | | | | | |
| | | mol | | | | | | |
| ω-Aminocarboxylic acid | 6-aminohexanoic acid | g | | | | | | |
| | | mol | | | | | | |
| Additive | sodium hypophosphite | g | 12.1 | 12.3 | 12.8 | 13.3 | 13.7 | 13.0 |
| | | mmol | 114.5 | 116.4 | 120.8 | 125.6 | 129.6 | 122.3 |
| | sodium acetate | g | 6.6 | 6.7 | 6.9 | 7.2 | 7.4 | 7.0 |
| | | mmol | 80.2 | 85.0 | 84.5 | 87.9 | 90.7 | 85.6 |
| Specified molar ratio | | — | 0.970 | 0.970 | 0.970 | 0.930 | 0.900 | 0.970 |
| Charged monomer composition | aromatic diamine | % by mol | 48.0 | 46.7 | 43.8 | 43.0 | 42.4 | 43.8 |
| | aliphatic dicarboxylic acid | % by mol | 49.5 | 48.1 | 45.2 | 46.2 | 47.0 | 45.2 |
| | aromatic dicarboxylic acid | % by mol | | | | | | |
| | amino acid | % by mol | 2.5 | 5.2 | 11.0 | 10.8 | 10.6 | 11.0 |
| | aminocarboxylic acid | % by mol | | | | | | |
| Amino acid content | | % by mol | 2.5 | 5.1 | 10.8 | 10.8 | 10.5 | 11.0 |
| Relative viscosity | | | 1.53 | 1.51 | 1.18 | 1.31 | 1.04 | 1.59 |
| Number average molecular weight | | | 8,200 | 7,870 | 3,200 | 5,120 | 1,230 | 8,950 |
| Melting point | | °C. | 231 | 225 | 207 | 207 | 200 | 208 |
| Oxygen absorbing amount (40° C., 100% RH, 28 days) | | cc/g | 5 | 9 | 18 | 17 | 19 | 16 |

| | | | Example | | | | | |
|---|---|---|---|---|---|---|---|---|
| | | | 407 | 408 | 409 | 410 | 411 | 412 |
| Aromatic diamine | MXDA | g | 12,500 | 12,000 | 11,500 | 9,500 | 10,000 | 10,000 |
| | | mol | 91.8 | 88.1 | 84.4 | 69.8 | 73.4 | 73.4 |
| Aliphatic dicarboxylic acid | adipic acid | g | 13,274 | 13,274 | 12,721 | 10,509 | | |
| | | mol | 90.8 | 90.8 | 87.1 | 71.9 | | |
| | sebacic acid | g | | | | | 14,850 | |
| | | mol | | | | | 73.4 | |
| | dodecanedioic acid | g | | | | | | 16,909 |
| | | mol | | | | | | 73.4 |
| Aromatic dicarboxylic acid | isophthalic acid | g | | | | | | |
| | | mol | | | | | | |
| | terephthalic acid | g | | | | | | |
| | | mol | | | | | | |
| | 2,6-naphthalene-dicarboxylic acid | g | | | | | | |
| | | mol | | | | | | |
| Amino acid | DL-alanine | g | | 3,364 | 5,015 | 9,321 | 1,635 | 1,635 |
| | | mol | | 37.8 | 56.3 | 104.6 | 18.4 | 18.4 |
| | DL-2-amino butyric acid | g | | | | | | |
| | | mol | | | | | | |
| | DL-phenylalanine | g | 3,790.2 | | | | | |
| | | mol | 22.94 | | | | | |

TABLE 5-continued

|  |  |  | | | | | | |
|---|---|---|---|---|---|---|---|---|
|  | glycine | g | | | | | | |
|  |  | mol | | | | | | |
| ω-Aminocarboxylic acid | 6-aminohexanoic acid | g | | | | | | |
|  |  | mol | | | | | | |
| Additive | sodium hypophosphite | g | 13.7 | 12.9 | 13.6 | 12.9 | 12.1 | 13.1 |
|  |  | mmol | 129.2 | 121.4 | 123.2 | 121.8 | 113.9 | 123.8 |
|  | sodium acetate | g | 7.4 | 7.0 | 7.1 | 7.0 | 6.5 | 7.1 |
|  |  | mmol | 90.5 | 85.0 | 86.3 | 85.3 | 79.7 | 86.7 |
| Specified molar ratio |  | — | 0.970 | 0.970 | 0.970 | 0.970 | 1.000 | 1.000 |
| Charged monomer composition | aromatic diamine | % by mol | 44.7 | 40.7 | 37.1 | 28.3 | 44.4 | 44.4 |
|  | aliphatic dicarboxylic acid | % by mol | 44.2 | 41.9 | 38.2 | 29.2 | 44.4 | 44.4 |
|  | aromatic dicarboxylic acid | % by mol | | | | | | |
|  | amino acid | % by mol | 11.1 | 17.4 | 24.7 | 42.5 | 11.2 | 11.2 |
|  | aminocarboxylic acid | % by mol | | | | | | |
| Amino acid content |  | % by mol | 11.0 | 17.1 | 24.5 | 42.1 | 11.0 | 11.1 |
| Relative viscosity |  |  | 1.60 | 1.57 | 1.53 | 1.45 | 1.41 | 1.28 |
| Number average molecular weight |  |  | 9,130 | 8,790 | 8,100 | 7,040 | 6,500 | 4,570 |
| Melting point |  | °C. | 207 | N.D. | N.D. | N.D. | N.D. | N.D. |
| Oxygen absorbing amount (40°C., 100% RH, 28 days) |  | cc/g | 15 | 30 | 37 | 65 | 11 | 13 |

|  |  |  | Example | | | | Comparative Example | |
|---|---|---|---|---|---|---|---|---|
|  |  |  | 413 | 414 | 415 | 416 | 401 | 402 |
| Aromatic diamine | MXDA | g | 12,000 | 12,000 | 12,500 | 11,184 | 12,500 | 12,500 |
|  |  | mol | 88.1 | 88.1 | 91.8 | 82.1 | 91.8 | 91.8 |
| Aliphatic dicarboxylic acid | adipic acid | g | 11,266 | 11,266 | 11,736 | 12,000 | 13,827 | 13,829 |
|  |  | mol | 77.1 | 77.1 | 80.3 | 82.1 | 94.6 | 94.6 |
|  | sebacic acid | g | | | | | | |
|  |  | mol | | | | | | |
|  | dodecanedioic acid | g | | | | | | |
|  |  | mol | | | | | | |
| Aromatic dicarboxylic acid | isophthalic acid | g | 1,830 | | | | | |
|  |  | mol | 11.0 | | | | | |
|  | terephthalic acid | g | | 1,830 | | | | |
|  |  | mol | | 11.0 | | | | |
|  | 2,6-naphthalene-dicarboxylic acid | g | | | 2,480 | | | |
|  |  | mol | | | 11.5 | | | |
| Amino acid | DL-alanine | g | 1,962 | 1,962 | 1,962 | 1,829 | | |
|  |  | mol | 22.0 | 22.0 | 22.0 | 20.5 | | |
|  | DL-2-amino butyric acid | g | | | | | | |
|  |  | mol | | | | | | |
|  | DL-phenylalanine | g | | | | | | |
|  |  | mol | | | | | | |
|  | glycine | g | | | | | | 1,722 |
|  |  | mol | | | | | | 22.9 |
| ω-Aminocarboxylic acid | 6-aminohexanoic acid | g | | | | 1,197 | | |
|  |  | mol | | | | 9.1 | | |
| Additive | sodium hypophosphite | g | 12.1 | 12.1 | 12.9 | 11.7 | 12.0 | 12.6 |
|  |  | mmol | 114.0 | 114.0 | 121.5 | 110.0 | 112.9 | 119.2 |
|  | sodium acetate | g | 6.5 | 6.5 | 7.0 | 6.3 | 6.5 | 6.8 |
|  |  | mmol | 79.8 | 79.8 | 85.1 | 77.0 | 79.0 | 83.4 |
| Specified molar ratio |  | — | 1.000 | 1.000 | 1.000 | 1.000 | 0.970 | 0.970 |
| Charged monomer composition | aromatic diamine | % by mol | 44.4 | 44.4 | 44.6 | 42.4 | 49.2 | 43.8 |
|  | aliphatic dicarboxylic acid | % by mol | 38.9 | 38.9 | 39.1 | 42.4 | 50.8 | 45.2 |
|  | aromatic dicarboxylic acid | % by mol | 5.6 | 5.6 | 5.6 | | | |
|  | amino acid | % by mol | 11.1 | 11.1 | 10.7 | 10.5 | | 11.0 |
|  | aminocarboxylic acid | % by mol | | | | 4.7 | | |
| Amino acid content |  | % by mol | 10.8 | 11.0 | 10.5 | 10.3 | 0.0 | 10.7 |
| Relative viscosity |  |  | 1.60 | 1.50 | 1.49 | 1.43 | 1.37 | 1.46 |
| Number average molecular weight |  |  | 9,100 | 7,700 | 7,540 | 6,750 | 5,950 | 7,230 |
| Melting point |  | °C. | N.D. | N.D. | N.D. | 210 | 237 | 207 |
| Oxygen absorbing amount (40°C., 100% RH, 28 days) |  | cc/g | 14 | 15 | 7 | 9 | 0 | 0 |

|  |  |  | Comparative Example | | | | |
|---|---|---|---|---|---|---|---|
|  |  |  | 403 | 404 | 405 | 406 | 407 |
| Aromatic diamine | MXDA | g | 12,500 | 10,000 | 10,000 | 12,000 | 12,000 |
|  |  | mol | 91.8 | 73.4 | 73.4 | 88.1 | 82.1 |
| Aliphatic dicarboxylic acid | adipic acid | g | 13,829 | | | 11,588 | 11,184 |
|  |  | mol | 94.6 | | | 79.3 | 82.1 |
|  | sebacic acid | g | | 14,850 | | | |
|  |  | mol | | 73.4 | | | |

TABLE 5-continued

|  |  |  |  |  |  |  |  |
|---|---|---|---|---|---|---|---|
|  | dodecanedioic acid | g |  |  |  | 16,909 |  |
|  |  | mol |  |  |  | 73.4 |  |
| Aromatic dicarboxylic acid | isophthalic acid | g |  |  |  |  | 1,463.8 |
|  |  | mol |  |  |  |  | 8.8 |
|  | terephthalic acid | g |  |  |  |  |  |
|  |  | mol |  |  |  |  |  |
|  | 2,6-naphthalene-dicarboxylic acid | g |  |  |  |  |  |
|  |  | mol |  |  |  |  |  |
| Amino acid | DL-alanine | g |  |  |  |  |  |
|  |  | mol |  |  |  |  |  |
|  | DL-2-amino butyric acid | g |  |  |  |  |  |
|  |  | mol |  |  |  |  |  |
|  | DL-phenylalanine | g |  |  |  |  |  |
|  |  | mol |  |  |  |  |  |
|  | glycine | g | 2,366 |  |  |  |  |
|  |  | mol | 22.9 |  |  |  |  |
| ω-Aminocarboxylic acid | 6-aminohexanoic acid | g |  |  |  |  | 1,197 |
|  |  | mol |  |  |  |  | 9.1 |
| Additive | sodium hypophosphite | g | 13.0 | 11.4 | 12.5 | 11.2 | 10.9 |
|  |  | mmol | 122.3 | 107.5 | 117.5 | 106.1 | 103.0 |
|  | sodium acetate | g | 7.0 | 6.2 | 6.7 | 6.1 | 5.9 |
|  |  | mmol | 85.6 | 75.3 | 82.3 | 74.3 | 72.1 |
| Specified molar ratio |  | — | 0.970 | 1.000 | 1.000 | 1.000 | 1.000 |
| Charged monomer composition | aromatic diamine | % by mol | 43.8 | 50.0 | 50.0 | 50.0 | 47.4 |
|  | aliphatic dicarboxylic acid | % by mol | 45.2 | 50.0 | 50.0 | 45.0 | 47.4 |
|  | aromatic dicarboxylic acid | % by mol |  |  |  | 5.0 |  |
|  | amino acid | % by mol | 11.0 |  |  |  |  |
|  | aminocarboxylic acid | % by mol |  |  |  |  | 5.2 |
| Amino acid content |  | % by mol | 10.6 | 0.0 | 0.0 | 0.0 | 0.0 |
| Relative viscosity |  |  | 1.29 | 1.56 | 1.55 | 1.57 | 1.54 |
| Number average molecular weight |  |  | 4,820 | 8,520 | 8,490 | 8,790 | 8,320 |
| Melting point |  | ° C. | 207 | 192 | 187 | 230 | 227 |
| Oxygen absorbing amount (40° C., 100% RH, 28 days) |  | cc/g | 0 | 0 | 0 | 0 | 0 |

*N.D.: not detected

As clear from the results in Table 5, the polyamide oligomer that is not polymerized with an α-amino acid having tertiary hydrogen (Comparative Examples 401 and 404 to 407) and the polyamide oligomer that is copolymerized with an amino acid having no tertiary hydrogen (Comparative Examples 402 and 403) exhibit no oxygen absorbing capability. The polyamide oligomer that is copolymerized with an α-amino acid having tertiary hydrogen (Examples 401 to 416) exhibits a sufficient oxygen absorbing capability without a metal contained. Accordingly, the polyamide compound of the present invention may be used as an oxygen absorbent.

INDUSTRIAL APPLICABILITY

The polyamide compound of the present invention is excellent in oxygen absorbing capability. By applying the polyamide compound of the present invention to a packaging material and a packaging container, such a packaging material and a packaging container are provided that exhibit a sufficient oxygen absorbing capability without a metal contained, generate no offensive odor, and have considerably good transparency, thereby storing a content in good conditions.

The invention claimed is:

1. A polyamide compound, comprising:
from 25 to 50% by mol of a diamine unit comprising an aromatic diamine unit represented by formula (I), in an amount of 50% by mol or more:

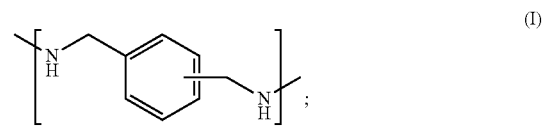

from 25 to 50% by mol of a dicarboxylic acid unit comprising a linear aliphatic dicarboxylic acid unit represented by formula (II-1), an aromatic dicarboxylic acid unit represented by formula (II-2), or both, in an amount in total of 50% by mol or more:

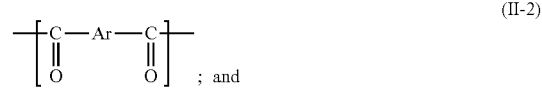

from 0.1 to 50% by mol of a constitutional unit represented by formula (III):

wherein:
in the formula (II-1), n represents an integer of from 2 to 18;
in the formula (II-2), Ar represents an arylene group; and
in the formula (III), R represents a substituted or unsubstituted alkyl group or a substituted or unsubstituted aryl group.

2. The polyamide compound of claim 1, wherein R in the formula (III) represents a substituted or unsubstituted alkyl group having from 1 to 6 carbon atoms or a substituted or unsubstituted aryl group having from 6 to 10 carbon atoms.

3. The polyamide compound of claim 1, wherein the diamine unit comprises an m-xylylenediamine unit in an amount of 50% by mol or more.

4. The polyamide compound of claim 1, comprising the linear aliphatic dicarboxylic acid unit comprising at least one selected from the group consisting of an adipic acid unit, a sebacic acid unit and a 1,12-dodecanedicarboxylic acid unit, in an amount in total of 50% by mol or more.

5. The polyamide compound of claim 1, comprising the aromatic dicarboxylic acid unit comprising at least one selected from the group consisting of an isophthalic acid unit, a terephthalic acid unit and a 2,6-naphthalenedicarboxylic acid unit, in an amount in total of 50% by mol or more.

6. The polyamide compound of claim 1, further comprising an ω-aminocarboxylic acid unit represented by general formula (A), in an amount of from 0.1 to 49.9% by mol based on the total constitutional units of the polyamide compound:

wherein, in the formula (A), p represents an integer of from 2 to 18.

7. The polyamide compound of claim 6, wherein the ω-aminocarboxylic acid unit comprises a 6-aminohexanoic acid unit, a 12-aminododecanoic acid unit, or both in an amount in total of 50% by mol or more.

8. The polyamide compound of claim 1, wherein the polyamide compound has a relative viscosity of from 1.8 to 4.2.

9. The polyamide compound of claim 1, wherein the polyamide compound has a relative viscosity of 1.01 or more and less than 1.8.

10. The polyamide compound of claim 2, wherein the linear aliphatic dicarboxylic acid unit comprises at least one selected from the group consisting of an adipic acid unit, a sebacic acid unit and a 1,12-dodecanedicarboxylic acid unit, in an amount in total of 50% by mol or more.

11. The polyamide compound of claim 2, wherein the aromatic dicarboxylic acid unit comprises at least one selected from the group consisting of an isophthalic acid unit, a terephthalic acid unit and a 2,6-naphthalenedicarboxylic acid unit, in an amount in total of 50% by mol or more.

12. The polyamide compound of claim 2, further comprising an ω-aminocarboxylic acid unit represented by formula (A), in an amount of from 0.1 to 49.9% by mol based on the total constitutional units of the polyamide compound:

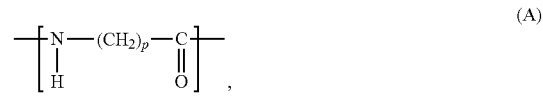

wherein, in the formula (A), p represents an integer of from 2 to 18.

13. A sheet comprising the polyamide compound according to claim 1.

14. A container in the form of a tray comprising the polyamide compound according to claim 1.

15. A container in the form of a cup comprising the polyamide compound according to claim 1.

16. A tube comprising the polyamide compound according to claim 1.

17. The polyamide compound of claim 1, wherein said polyamide compound comprises said linear aliphatic dicarboxylic acid unit represented by formula (II-1).

18. The polyamide compound of claim 1, wherein said polyamide compound comprises said aromatic dicarboxylic acid unit represented by formula (II-2).

19. The polyamide compound of claim 1, wherein said polyamide compound comprises both said linear aliphatic dicarboxylic acid unit represented by formula (II-1) and said aromatic dicarboxylic acid unit represented by formula (II-2).

* * * * *